(12) United States Patent
Hu et al.

(10) Patent No.: US 9,954,773 B2
(45) Date of Patent: Apr. 24, 2018

(54) LABEL SWITCHING PATH ESTABLISHMENT METHOD, DATA FORWARDING METHOD, AND DEVICE

(71) Applicant: Huawei Technologies Co., Ltd., Shenzhen, Guangdong (CN)

(72) Inventors: Jiehui Hu, Beijing (CN); Xiaoqian Wu, Shenzhen (CN); Yongnian Huang, Shenzhen (CN); Xinping Wang, Beijing (CN); Jie Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 421 days.

(21) Appl. No.: 14/598,624

(22) Filed: Jan. 16, 2015

(65) Prior Publication Data
US 2015/0124830 A1    May 7, 2015

Related U.S. Application Data

(63) Continuation of application No. PCT/CN2012/078704, filed on Jul. 16, 2012.

(51) Int. Cl.
*H04L 12/723* (2013.01)
*H04L 12/717* (2013.01)
(Continued)

(52) U.S. Cl.
CPC ............ *H04L 45/507* (2013.01); *H04L 45/20* (2013.01); *H04L 45/42* (2013.01); *H04L 45/22* (2013.01); *H04L 45/64* (2013.01)

(58) Field of Classification Search
CPC ....... H04L 45/507; H04L 45/42; H04L 45/22; H04L 41/042; H04L 41/085; H04L 45/64; H04L 45/20
See application file for complete search history.

(56) References Cited

U.S. PATENT DOCUMENTS

2006/0133300 A1* 6/2006 Lee .................. H04L 45/00
370/254
2008/0130627 A1* 6/2008 Chen ................ H04L 45/02
370/351
(Continued)

FOREIGN PATENT DOCUMENTS

CN    1700671 A    11/2005
CN    101729384 A    6/2010
(Continued)

OTHER PUBLICATIONS

J. Medved, et al., "MPLS-TP Pseudowire Configuration using OpenFlow 1.3", Network Working Group, Jul. 10, 2012, 20 pages.

*Primary Examiner* — Ian N Moore
*Assistant Examiner* — Justin T Van Roie

(57) ABSTRACT

Embodiments of the present invention provide a label switching path establishment method, a data forwarding method, and a device. The establishment method includes: determining, by a first service controller, each hop on an LSP from a preset ingress to a preset egress, allocating, from first label space information of each hop, a label to each hop, determining incoming and outgoing information of each hop according to topology information of each hop, generating forwarding data of each hop, and sending the forwarding data of each hop to a node device corresponding to each hop to complete establishment of the LSP. A technical solution of the present invention can alleviate burden of a node device in an MPLS network and increase the number of LSPs that the node device is capable of supporting.

22 Claims, 11 Drawing Sheets

(51) Int. Cl.
*H04L 12/733* (2013.01)
*H04L 12/707* (2013.01)
*H04L 12/715* (2013.01)

(56) References Cited

U.S. PATENT DOCUMENTS

2011/0188857 A1 8/2011 Zheng
2012/0092986 A1 4/2012 Chen

FOREIGN PATENT DOCUMENTS

| CN | 102487352 A | 6/2012 |
| EP | 1 580 943 A2 | 9/2005 |
| EP | 1 672 851 A1 | 6/2006 |
| JP | 2008060995 A | 3/2008 |

\* cited by examiner

LABEL SWITCHING PATH ESTABLISHMENT METHOD, DATA FORWARDING METHOD, AND DEVICE

CROSS-REFERENCE TO RELATED APPLICATIONS

This application is a continuation of International Application No. PCT/CN2012/078704, filed on Jul. 16, 2012, which is hereby incorporated by reference in its entirety.

TECHNICAL FIELD

This application relates to communications technologies, and in particular, to a label switching path (LSP) establishment method, a data forwarding method, and a device.

BACKGROUND

In an existing Multiprotocol Label Switching (MPLS) domain, the Resource Reservation Protocol-Traffic Engineering (RSVP-TE) signaling protocol is generally used to establish an LSP.

In an MPLS network, each node is configured with the RSVP-TE protocol and is configured with an interface with a need to run the RSVP-TE protocol to run the RSVP-TE protocol. Between two adjacent nodes in the MPLS network, the RSVP-TE protocol maintains a peer relationship between the nodes by using a Hello packet. When an LSP is established, the RSVP-TE protocol sends, from an ingress, a path message downstream and hop by hop and then sends, from an egress, a reservation (Resv) message to the ingress. When receiving the Resv message, each hop on a link reserves a bandwidth resource for the LSP, allocates a label, and sends the label to an upstream node by using the Resv message. After the Resv message arrives at the ingress, the RSVP-TE protocol regards that the entire LSP is successfully established.

By default, the RSVP-TE protocol sends a Hello message periodically every 3 s, sends the Path message to the downstream node periodically every 3 s, and sends the Resv message to the upstream node. It is evident that, in order to maintain link and LSP status information, the RSVP-TE protocol needs to send lots of soft state packets such as Hello, Path, and Resv, which causes heavy load to a node and reduces the number of RSVP-TE LSPs that the node is capable of supporting.

SUMMARY

This application provides a label switching path establishment method, a data forwarding method, and a device, so as to alleviate burden of a forwarding device in an MPLS network and increase the number of LSPs that the forwarding device is capable of supporting.

According to one aspect, this application provides a label switching path establishment method, including:

determining, by a first service controller, each hop on an LSP from a preset ingress to a preset egress; and allocating, by the first service controller from first label space information of each hop, a label to each hop, determining incoming and outgoing interface information of each hop according to topology information of each hop, generating forwarding data of each hop, and sending the forwarding data of each hop to a node device corresponding to each hop to complete establishment of the LSP.

In an optional implementation manner of the foregoing method, the determining, by a first service controller, each hop on an LSP from a preset ingress to a preset egress includes: determining, by the first service controller, each hop on a first LSP and a second LSP that have a primary/standby protection relationship and are from the preset ingress to the preset egress.

In an optional implementation manner of the foregoing method, the allocating, by the first service controller from first label space information of each hop, a label to each hop, determining incoming and outgoing interface information of each hop according to topology information of each hop, generating forwarding data of each hop, and sending the forwarding data of each hop to a node device corresponding to each hop to complete establishment of the LSP includes: allocating, by the first service controller from first label space information of each hop on the first LSP, a label to each hop on the first LSP, determining incoming and outgoing interface information of each hop on the first LSP according to topology information of each hop on the first LSP, generating forwarding data of each hop on the first LSP, and then sending the forwarding data of each hop on the first LSP to a node device corresponding to each hop on the first LSP to complete establishment of the first LSP.

In an optional implementation manner of the foregoing method, the method further includes: sending, by the first service controller, identifier information of each hop on the second LSP to a second service controller, so that the second service controller allocates, from second label space information of each hop on the second LSP, a label to each hop on the second LSP, determines incoming and outgoing interface information of each hop on the second LSP according to topology information of each hop on the second LSP, generates forwarding data of each hop on the second LSP, and then sends the forwarding data of each hop on the second LSP to a node device corresponding to each hop on the second LSP to complete establishment of the second LSP.

In an optional implementation manner of the foregoing method, the first service controller and the second service controller are connected through another network except a first network to which the first service controller and the second service controller belong;

the determining, by the first service controller, each hop on a first LSP from the preset ingress to the preset egress includes: determining, by the first service controller, each hop that is located in the first network on the first LSP from the preset ingress to the preset egress, where the first LSP passes through the other network; and accordingly, the allocating, by the first service controller from first label space information of each hop on the first LSP, a label to each hop on the first LSP, determining incoming and outgoing interface information of each hop on the first LSP according to the topology information of each hop on the first LSP, and generating forwarding data of each hop on the first LSP includes:

triggering, by the first service controller, establishment of a third LSP, where the third LSP is an LSP that uses the first service controller as an ingress, uses the second service controller as an egress, and passes through the other network; and allocating, by the first service controller from first label space information of each hop that is located in the first network on the first LSP, a label to each hop that is located in the first network on the first LSP; determining incoming and outgoing interface information of each hop that is located in the first network on the first LSP according to topology information of each hop that is located in the first network on the first LSP; stitching the first LSP and the third LSP; and generating forwarding data of each hop that is located in the first network and each hop that is located in the other network on the first LSP.

In an optional implementation manner of the foregoing method, the stitching, by the first service controller, the first LSP and the third LSP includes:

allocating, by the first service controller, an incoming label to the first service controller on the third LSP, where the incoming label is an outgoing label of a previous hop of the first service controller on the first LSP; and allocating, by the first service controller, an outgoing label to the second service controller on the third LSP, where the outgoing label is an incoming label of a next hop of the second service controller on the first LSP, where each hop on the third LSP except the first service controller and the second service controller constitutes each hop that is located in the other network on the first LSP.

In an optional implementation manner of the foregoing method, the first service controller and the second service controller are connected through another network except a first network to which the first service controller and the second service controller belong;

the determining, by the first service controller, each hop on a second LSP from the preset ingress to the preset egress includes: determining, by the first service controller, each hop that is located in the first network on the second LSP from the preset ingress to the preset egress, where the second LSP passes through the other network; and accordingly, the sending, by the first service controller, identifier information of each hop on the second LSP to a second service controller includes:

triggering, by the first service controller, establishment of a fourth LSP, where the fourth LSP is an LSP that uses the first service controller as an ingress, uses the second service controller as an egress, and passes through the other network; and sending, by the first service controller, a stitching and binding relationship between the second LSP and the fourth LSP, identifier information of each hop that is located in the first network on the second LSP, and identifier information of the ingress of the fourth LSP to the second service controller.

In an optional implementation manner of the foregoing method, the allocating, by the first service controller from first label space information of each hop, a label to each hop, determining incoming and outgoing interface information of each hop according to topology information of each hop, generating forwarding data of each hop, and sending the forwarding data of each hop to a node device corresponding to each hop to complete establishment of the LSP includes: allocating, by the first service controller from first label space information of each hop on the first LSP, a label to each hop on the first LSP, determining incoming and outgoing interface information of each hop on the first LSP according to topology information of each hop on the first LSP, generating forwarding data of each hop on the first LSP, and then sending the forwarding data of each hop on the first LSP to a node device corresponding to each hop on the first LSP to complete establishment of the first LSP; and allocating, by the first service controller from first label space information of each hop on the second LSP, a label to each hop on the second LSP, determining incoming and outgoing interface information of each hop on the second LSP according to topology information of each hop on the second LSP, generating forwarding data of each hop on the second LSP, and then sending the forwarding data of each hop on the second LSP to a node device corresponding to each hop on the second LSP to complete establishment of the second LSP.

In an optional implementation manner of the foregoing method, before the determining, by a first service controller, each hop on an LSP from a preset ingress to a preset egress, the method includes: receiving, by the first service controller, registration information sent by each forwarding device in a network to which the first service controller belongs, where the registration information includes topology information of the forwarding device and first label space information of the forwarding device.

In an optional implementation manner of the foregoing method, the method further includes: sending, by the first service controller, identifier information of each hop on the first LSP to the second service controller for backup.

In an optional implementation manner of the foregoing method, the first LSP and the second LSP are both bidirectional LSPs; or the first LSP and the second LSP are both unidirectional LSPs.

In an optional implementation manner of the foregoing method, the first LSP and the second LSP are both point-to-point P2P LSPs; or the first LSP and the second LSP are both point-to-multipoint P2MP LSPs.

According to one aspect, this application further provides a service controller, including:

a determining module, configured to determine each hop on an LSP from a preset ingress to a preset egress;

a first generating module, configured to allocate, from first label space information of each hop, a label to each hop, determine incoming and outgoing information of each hop according to topology information of each hop, and generate forwarding data of each hop; and a first sending module, configured to send the forwarding data of each hop to a node device corresponding to each hop to complete establishment of the LSP.

In an optional implementation manner of the foregoing service controller, the determining module is specifically configured to determine each hop on a first LSP and a second LSP that have a primary/standby protection relationship from the preset ingress to the preset egress.

In an optional implementation manner of the foregoing service controller, the first generating module is specifically configured to allocate, from first label space information of each hop on the first LSP, a label to each hop on the first LSP, determine incoming and outgoing interface information of each hop on the first LSP according to topology information of each hop on the first LSP, and generate forwarding data of each hop on the first LSP; and the first sending module is specifically configured to send the forwarding data of each hop on the first LSP to a node device corresponding to each hop on the first LSP to complete establishment of the first LSP.

In an optional implementation manner of the foregoing service controller, the service controller further includes: a second sending module, configured to send identifier information of each hop on the second LSP to a second service controller, so that the second service controller allocates, from second label space information of each hop on the second LSP, a label to each hop on the second LSP, determines incoming and outgoing interface information of each hop on the second LSP according to topology information of each hop on the second LSP, generates forwarding data of each hop on the second LSP, and then sends the forwarding data of each hop on the second LSP to a node device corresponding to each hop on the second LSP to complete establishment of the second LSP.

In an optional implementation manner of the foregoing service controller, the service controller and the second service controller are connected through another network except a first network to which the service controller and the second service controller belong;

the determining module is more specifically configured to determine each hop that is located in the first network on the first LSP from the preset ingress to the preset egress, where the first LSP passes through the other network; and the first generating module is more specifically configured to: trigger establishment of a third LSP, allocate, from first label space information of each hop that is located in the first network on the first LSP, a label to each hop that is located in the first network on the first LSP, determine incoming and outgoing interface information of each hop that is located in the first network on the first LSP according to topology information of each hop that is located in the first network on the first LSP, stitch the first LSP and the third LSP, and generate forwarding data of each hop that is located in the first network and each hop that is located in the other network on the first LSP, where the third LSP is an LSP that uses the service controller as an ingress, uses the second service controller as an egress, and passes through the other network.

In an optional implementation manner of the foregoing service controller, the first generating module is more specifically configured to allocate an incoming label to the service controller on the third LSP, where the incoming label is an outgoing label of a previous hop of the service controller on the first LSP; and allocate an outgoing label to the second service controller on the third LSP, where the outgoing label is an incoming label of a next hop of the second service controller on the first LSP, where each hop on the third LSP except the service controller and the second service controller constitutes each hop that is located in the other network on the first LSP.

In an optional implementation manner of the foregoing service controller, the service controller and the second service controller are connected through another network except a first network to which the service controller and the second service controller belong;

the determining module is more specifically configured to determine each hop that is located in the first network on the second LSP from the preset ingress to the preset egress, where the second LSP passes through the other network; and the second sending module is specifically configured to trigger establishment of a fourth LSP, and send a stitching and binding relationship between the second LSP and the fourth LSP, identifier information of each hop that is located in the first network on the second LSP, and identifier information of an ingress of the fourth LSP to the second service controller, where the fourth LSP is an LSP that uses the service controller as the ingress, uses the second service controller as an egress, and passes through the other network.

In an optional implementation manner of the foregoing service controller, the first generating module is specifically configured to allocate, from first label space information of each hop on the first LSP, a label to each hop on the first LSP, determine incoming and outgoing interface information of each hop on the first LSP according to topology information of each hop on the first LSP, and generate forwarding data of each hop on the first LSP; and allocate, from first label space information of each hop on the second LSP, a label to each hop on the second LSP, determine incoming and outgoing interface information of each hop on the second LSP according to topology information of each hop on the second LSP, and generate forwarding data of each hop on the second LSP; and the first sending module is specifically configured to send the forwarding data of each hop on the first LSP to a node device corresponding to each hop on the first LSP to complete establishment of the first LSP, and send the forwarding data of each hop on the second LSP to a node device corresponding to each hop on the second LSP to complete establishment of the second LSP.

In an optional implementation manner of the foregoing service controller, the service controller further includes: a first receiving module, configured to receive registration information sent by each forwarding device in a network to which the service controller belongs, where the registration information includes topology information of the forwarding device and first label space information of the forwarding device.

In an optional implementation manner of the foregoing service controller, the service controller further includes: a third sending module, configured to send identifier information of each hop on the first LSP to the second service controller for backup.

According to one aspect, this application further provides a service controller, including:

a processor, configured to determine each hop on an LSP from a preset ingress to a preset egress, allocate, from first label space information of each hop, a label to each hop, determine incoming and outgoing interface information of each hop according to topology information of each hop, and generate forwarding data of each hop; and a sender, configured to send the forwarding data of each hop, which is generated by the processor, to a node device corresponding to each hop to complete establishment of the LSP.

According to another aspect, this application provides a label switching path establishment method, including:

receiving, by a second service controller, identifier information, which is sent by a first service controller, of each hop on a second LSP, where the second LSP is an LSP, which is determined by the first service controller, from a preset ingress to a preset egress;

allocating, by the second service controller from second label space information of each hop on the second LSP, a label to each hop on the second LSP, determining incoming and outgoing interface information of each hop on the second LSP according to topology information of each hop on the second LSP, and generating forwarding data of each hop on the second LSP; and sending, by the second service controller, the forwarding data of each hop on the second LSP to a node device corresponding to each hop on the second LSP to complete establishment of the second LSP.

In an optional implementation manner of the foregoing method, the first service controller and the second service controller are connected through another network except a first network to which the first service controller and the second service controller belong;

the receiving, by a second service controller, identifier information, which is sent by a first service controller, of each hop on a second LSP includes: receiving, by the second service controller from the first service controller, a stitching and binding relationship between the second LSP and a fourth LSP, identifier information of each hop that is located in the first network on the second LSP, and identifier information of an ingress of the fourth LSP, where the fourth LSP is an LSP that is established upon triggering by the first service controller, uses the first service controller as the ingress, uses the second service controller as an egress, and passes through the other network.

In an optional implementation manner of the foregoing method, the allocating, by the second service controller from second label space information of each hop on the second LSP, a label to each hop on the second LSP, determining incoming and outgoing interface information of each hop on the second LSP according to topology information of each hop on the second LSP, and generating forwarding data of each hop on the second LSP includes:

allocating, by the second service controller from second label space information of each hop that is located in the first network on the second LSP, a label to each hop that is located in the first network on the second LSP, determining incoming and outgoing interface information of each hop that is located in the first network on the second LSP according to topology information of each hop that is located in the first network on the second LSP, stitching the second LSP and the fourth LSP, and generating forwarding data of each hop that is located in the first network and each hop that is located in the other network on the second LSP.

In an optional implementation manner of the foregoing method, the stitching, by the second service controller, the second LSP and the fourth LSP includes:

allocating, by the second service controller, an incoming label to the first service controller on the fourth LSP, where the incoming label is an outgoing label of a previous hop of the first service controller on the second LSP; and allocating, by the second service controller, an outgoing label to the second service controller on the fourth LSP, where the outgoing label is an incoming label of a next hop of the second service controller on the second LSP, where each hop on the fourth LSP except the first service controller and the second service controller constitutes each hop that is located in the other network on the second LSP.

In an optional implementation manner of the foregoing method, before the receiving, by a second service controller, identifier information, which is sent by a first service controller, of each hop on a second LSP, the method includes:

receiving, by the second service controller, registration information sent by each forwarding device in a network to which the second service controller belongs, where the registration information includes topology information of the forwarding device and second label space information of the forwarding device.

In an optional implementation manner of the foregoing method, the method further includes: receiving, by the second service controller, identifier information, which is sent by the first service controller, of each hop on a first LSP, where the first LSP is another LSP, which is determined by the first service controller, from the preset ingress to the preset egress, and the first LSP and the second LSP have a primary/standby protection relationship.

According to another aspect, this application further provides a service controller, including:

a second receiving module, configured to receive identifier information, which is sent by a first service controller, of each hop on a second LSP, where the second LSP is an LSP, which is determined by the first service controller, from a preset ingress to a preset egress;

a second generating module, configured to allocate, from second label space information of each hop on the second LSP, a label to each hop on the second LSP, determine incoming and outgoing interface information of each hop on the second LSP according to topology information of each hop on the second LSP, and generate forwarding data of each hop on the second LSP; and a fourth sending module, configured to send the forwarding data of each hop on the second LSP to a node device corresponding to each hop on the second LSP to complete establishment of the second LSP.

In an optional implementation manner of the foregoing service controller, the first service controller and the service controller are connected through another network except a first network to which the first service controller and the service controller belong; and the second receiving module is specifically configured to receive, from the first service controller, a stitching and binding relationship between the second LSP and a fourth LSP, identifier information of each hop that is located in the first network on the second LSP, and identifier information of an ingress of the fourth LSP, where the fourth LSP is an LSP that is established upon triggering by the first service controller, uses the first service controller as the ingress, uses the service controller as an egress, and passes through the other network.

In an optional implementation manner of the foregoing service controller, the second generating module is specifically configured to: allocate, from second label space information of each hop that is located in the first network on the second LSP, a label to each hop that is located in the first network on the second LSP, determine incoming and outgoing interface information of each hop that is located in the first network on the second LSP according to topology information of each hop that is located in the first network on the second LSP, stitch the second LSP and the fourth LSP, and generate forwarding data of each hop that is located in the first network and each hop that is located in the other network on the second LSP.

In an optional implementation manner of the foregoing service controller, the second generating module is more specifically configured to allocate an incoming label to the first service controller on the fourth LSP, where the incoming label is an outgoing label of a previous hop of the first service controller on the second LSP, and allocate an outgoing label to the service controller on the fourth LSP, where the outgoing label is an incoming label of a next hop of the service controller on the second LSP, where each hop on the fourth LSP except the first service controller and the service controller constitutes each hop that is located in the other network on the second LSP.

In an optional implementation manner of the foregoing service controller, the service controller further includes: a third receiving module, configured to receive registration information sent by each forwarding device in a network to which the service controller belongs, where the registration information includes topology information of the forwarding device and second label space information of the forwarding device.

In an optional implementation manner of the foregoing service controller, the service controller further includes: a fourth receiving module, configured to receive identifier information, which is sent by the first service controller, of each hop on a first LSP, where the first LSP is another LSP, which is determined by the first service controller, from the preset ingress to the preset egress, and the first LSP and the second LSP have a primary/standby protection relationship.

According to another aspect, this application further provides a service controller, including:

a receiver, configured to receive identifier information, which is sent by a first service controller, of each hop on a second LSP, where the second LSP is an LSP, which is determined by the first service controller, from a preset ingress to a preset egress;

a processor, configured to allocate, from second label space information of each hop on the second LSP, a label to each hop on the second LSP, determine incoming and outgoing interface information of each hop on the second LSP according to topology information of each hop on the second LSP, and generate forwarding data of each hop on the second LSP; and a sender, configured to send the forwarding data of each hop on the second LSP to a node device corresponding to each hop on the second LSP to complete establishment of the second LSP.

According to still another aspect, this application provides a data forwarding method, including:

receiving, by a forwarding device, forwarding data, which is sent by a service controller, of the forwarding device on a label switching path (LSP) from a preset ingress to a preset egress, where the forwarding data of the forwarding device includes a label that the service controller allocates to the forwarding device from label space information of the forwarding device, and incoming and outgoing interface information that the service controller determines for the forwarding device according to topology information of the forwarding device; and forwarding, by the forwarding device, data according to the forwarding data of the forwarding device.

In an optional implementation manner of the foregoing method, the service controller includes a first service controller and/or a second service controller; the LSP includes a first LSP and/or a second LSP of two LSPs that have a primary/standby protection relationship, where each hop on the first LSP is determined by the first service controller and each hop on the second LSP is determined by the first service controller and provided for the second service controller; and the label space information of the forwarding device includes first label space information and/or a second label space; and the receiving, by a forwarding device, forwarding data, which is sent by a service controller, of the forwarding device on an LSP from a preset ingress to a preset egress includes:

receiving, by the forwarding device, forwarding data, which is sent by the first service controller, of the forwarding device on the first LSP from the preset ingress to the preset egress; and/or receiving, by the forwarding device, forwarding data, which is sent by the second service controller, of the forwarding device on the second LSP from the preset ingress to the preset egress.

In an optional implementation method of the foregoing method, before the receiving, by a forwarding device, forwarding data, which is sent by a service controller, of the forwarding device on a label switching path (LSP) from a preset ingress to a preset egress, the method includes:

sending, by the forwarding device, first registration information to the first service controller, where the first registration information includes the topology information of the forwarding device and the first label space information of the forwarding device; and sending, by the forwarding device, second registration information to the second service controller, where the second registration information includes the topology information about the forwarding device and the second label space information of the forwarding device.

In an optional implementation manner of the foregoing method, the forwarding device is the preset ingress; and the forwarding, by the forwarding device, data according to the forwarding data of the forwarding device includes:

forwarding, by the forwarding device, the data according to the forwarding data of the forwarding device on the first LSP and the forwarding data of the forwarding device on the second LSP.

In an optional implementation manner of the foregoing method, the forwarding, by the forwarding device, the data according to the forwarding data of the forwarding device on the first LSP and the forwarding data of the forwarding device on the second LSP includes:

forwarding, by the forwarding device, the data according to the forwarding data of the forwarding device on the first LSP if the forwarding device discovers that the first service controller is normal; and forwarding, by the forwarding device, the data according to the forwarding data of the forwarding device on the second LSP if the forwarding device discovers that the first service controller is faulty.

According to still another aspect, this application further provides a forwarding device, including:

a fifth receiving module, configured to receive forwarding data, which is sent by a service controller, of the forwarding device on a label switching path (LSP) from a preset ingress to a preset egress, where the forwarding data of the forwarding device includes a label that the service controller allocates to the forwarding device from label space information of the forwarding device, and incoming and outgoing interface information that the service controller determines for the forwarding device, according to topology information of the forwarding device; and a fifth sending module, configured to forward data according to the forwarding data of the forwarding device.

In an optional implementation manner of the foregoing forwarding device, the service controller includes a first service controller and/or a second service controller; the LSP includes a first LSP and/or a second LSP of two LSPs that have a primary/standby protection relationship, where each hop on the first LSP is determined by the first service controller and each hop on the second LSP is determined by the first service controller and provided for the second service controller; and the label space information of the forwarding device includes first label space information and/or a second label space; and the fifth receiving module is specifically configured to receive forwarding data, which is sent by the first service controller, of the forwarding device on the first LSP from the preset ingress to the preset egress; and/or is specifically configured to receive forwarding data, which is sent by the second service controller, of the forwarding device on the second LSP from the preset ingress to the preset egress.

In an optional implementation manner of the foregoing forwarding device, the forwarding device further includes: a sixth sending module, configured to send first registration information to the first service controller and send second registration information to the second service controller, where the first registration information includes the topology information of the forwarding device and the first label space information of the forwarding device, and the second registration information includes the topology information of the forwarding device and the second label space information of the forwarding device.

In an optional implementation manner of the foregoing forwarding device, the forwarding device is the preset ingress; and the fifth sending module is specifically configured to forward the data according to the forwarding data of the forwarding device on the first LSP and the forwarding data of the forwarding device on the second LSP.

In an optional implementation manner of the foregoing forwarding device, the fifth sending module is more specifically configured to forward the data according to the forwarding data of the forwarding device on the first LSP if it is discovered that the first service controller is normal, and forward the data according to the forwarding data of the forwarding device on the second LSP if it is discovered that the first service controller is faulty.

According to still another aspect, this application further provides a forwarding device, including:

a receiver, configured to receive forwarding data, which is sent by a service controller, of the forwarding device on a label switching path (LSP) from a preset ingress to a preset egress, where the forwarding data of the forwarding device includes a label that the service controller allocates to the forwarding device from label space information of the forwarding device, and incoming and outgoing interface information that the service controller determines for the forwarding device according to topology information of the forwarding device; and a sender, configured to forward data according to the forwarding data of the forwarding device, which is received by the receiver.

According to the label switching path establishment method and the service controller provided by this application in one aspect, the service controller determines each hop on an LSP from a preset ingress to a preset egress, allocates a label to each hop, determines incoming and outgoing interface information of each hop, generates forwarding data of each hop, and then sends the forwarding data of each hop to a node device corresponding to each hop, so that each node device on the LSP can forward data according to the forwarding data sent by the service controller and there is no need to periodically send soft state packets, such as Hello, Path, and Resv, between node devices on the LSP, which alleviates load of the node devices and helps increase the number of RSVP-TE LSPs that each node device is capable of supporting.

According to the label switching path establishment method and the service controller provided by this application in another aspect, when there are two service controllers that work in hot backup mode, the other service controller determines each hop on an LSP from a preset ingress to a preset egress, while the service controller provided by this embodiment receives identifier information, provided by the other service controller, of each hop on the LSP, allocates a label to each hop, determines incoming and outgoing interface information of each hop, generates forwarding data of each hop, and then sends the forwarding data of each hop to a node device corresponding to each hop, so that each node device on the LSP can forward data according to the forwarding data sent by the service controller provided by this embodiment and there is no need to periodically send soft state packets, such as Hello, Path, and Resv, between node devices on the LSP, which alleviates load of the node devices and helps increase the number of RSVP-TE LSPs that each node device is capable of supporting.

According to the data forwarding method and the forwarding device provided by this application in still another aspect, the forwarding device, as a hop on an LSP from a preset ingress to a preset egress, receives forwarding data, which is sent by a service controller, of the forwarding device on the LSP from the preset ingress to the preset egress, generates a forwarding entry according the forwarding data, and forwards data according to the forwarding entry, so that there is no need to periodically send soft state packets, such as Hello, Path, and Resv, between the forwarding device and nodes on the LSP, which alleviates load of the forwarding device and helps increase the number of RSVP-TE LSPs that the forwarding device is capable of supporting.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Conventionally, in order to establish an LSP, forwarding devices in a network need to run a dynamic signaling protocol, for example, RSVP-TE, and soft state packets such as Hello, Path, and Resv need to be periodically sent between node devices to maintain status information of a link and an LSP between nodes, which causes heavy load to the node devices and affects the number of RSVP-TE LSPs that can be supported. With respect to this problem, the following embodiments of the present invention provide a solution. A main idea of the following embodiments is as follows: A service controller is separately set in a network. The service controller is a node device in the network and other node devices except the service controller in the network are used as forwarding devices (Forwarder). The service controller determines path (Hop) information of each LSP (that is, determines each hop on the LSP), allocates a label to each hop on the LSP, determines incoming and outgoing interface information and the like for each hop on the LSP, generates forwarding data of each hop, and then sends the forwarding data of each hop to a node device corresponding to each hop. In this way, unlike the conventional solution in which a dynamic signaling protocol needs to be run and soft state packets such as Hello, Path, and Resv need to be periodically sent to maintain status information of a link and an LSP between node devices, each node device on the LSP can directly forward data according to the forwarding data sent by the service controller and only needs to receive the forwarding data sent by the service controller, which alleviates burden of the node devices and helps increase the number of RSVP-TE LSPs that a node device is capable of supporting. Further, because the service controller determines each hop on an LSP and calculates forwarding data of each hop in a centralized manner, a user does not need to configure RSVP-TE configurations explicitly on each node device, which simplifies complexity of user configuration and maintainability and alleviates the user's configuration burden.

The foregoing network and a network involved in the following embodiments of the present invention may be a virtual cluster system, but no limitation is posed thereon.

Figure 1:
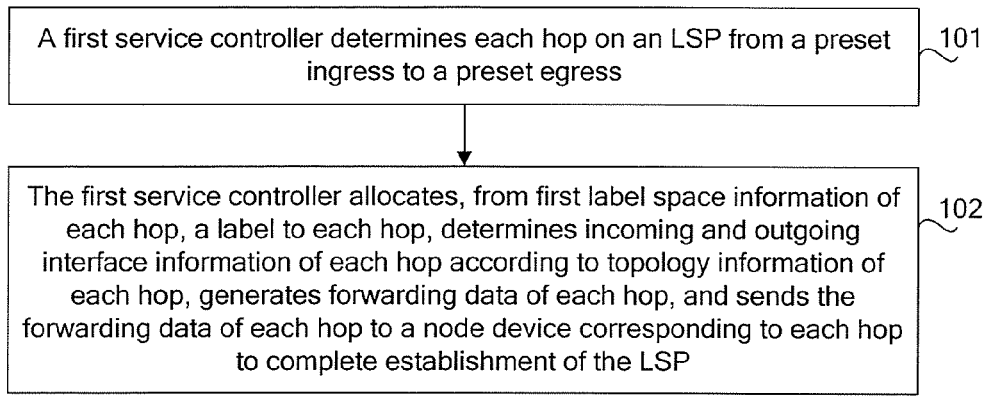
FIG. 1 is a flowchart of an LSP establishment method according to an embodiment of the present invention.

FIG. 1 is a flowchart of an LSP establishment method provided by an embodiment of the present invention. As shown in FIG. 1, the method provided by this embodiment includes:

Step 101: A first service controller determines each hop on an LSP from a preset ingress to a preset egress.

An ingress and an egress of each LSP may be preset by a user or an administrator. Optionally, the ingress or the egress may be a forwarding device or may be the first service controller.

A process for the first service controller to determine each hop on the LSP from the preset ingress to the preset egress is actually a process for the first service controller to calculate path information for the LSP from the preset ingress to the preset egress. For example, it is assumed that the ingress and the egress are a forwarding device A and a forwarding device D respectively. Hops that the first service controller determines for the LSP from the forwarding device A to the forwarding device D are the forwarding device A, a forwarding device B, a forwarding device C, and the forwarding device D, which is equivalent to that path information that the first service controller calculates for the LSP from the forwarding device A to the forwarding device B is: the forwarding device A→the forwarding device B→the forwarding device C→the forwarding device D.

Optionally, the first service controller may use an algorithm similar to a Path Computation Element (PCE) algorithm, a Constraint Shortest Path First (CSPF) algorithm, or the like to determine each hop on the LSP. It is noted herein that an existing PCE is a method of offline path calculation and does not include operations of allocating a label and generating forwarding data after each hop on an LSP is determined. However, although the first service controller provided by this embodiment uses the algorithm similar to the PCE to determine each hop on an LSP, a focus lies in a process of allocating a label and generating forwarding data after each hop on the LSP is determined, which is different from the existing PCE.

Step 102: The first service controller allocates, from first label space information of each hop, a label to each hop, determines incoming and outgoing interface information of each hop according to topology information of each hop, generates forwarding data of each hop, and sends the forwarding data of each hop to a node device corresponding to each hop to complete establishment of the LSP.

It is noted herein that the node device corresponding to each hop on each LSP in the embodiments of the present invention may be a forwarding device, and may also be the first service controller or a second service controller.

In this embodiment, before step 101, the method includes: receiving, by the first service controller, registration information sent by forwarding devices in a network to which the first service controller belongs, where the registration information includes topology (topo) information of the forwarding devices and first label space information of the forwarding devices. In other words, after the forwarding devices in the network to which the first service controller belongs join the network, the forwarding devices register their own topology information and first label space information with the first service controller in advance. The topology information includes but is not limited to interface information of the forwarding devices, such as an interface index and a media access control (MAC) address. Here, the first label space information of each forwarding device refers to label space information that each forwarding device registers with the first service controller. Each forwarding device may further include other label space information besides the first label space information.

That is, the first service controller stores the topology information and the first label space information of each forwarding device in the network. In addition, the first service controller also stores its own topology information and label space information. Therefore, the first service controller stores the topology information and the first label space information of each hop on the LSP from the preset ingress to the preset egress.

In this way, after determining each hop on the LSP from the preset ingress to the preset egress, the first service controller can acquire the first label space information of each hop and the topology information of each hop according to identifier information of each hop, allocate, from the first label space information of each hop, the label to each hop, and determines the incoming and outgoing interface information of each hop according to the topology information of each hop, so that the forwarding data of each hop is generated. That the first service controller allocates, from first label space information of each hop, a label to each hop includes: allocating an incoming label and/or an outgoing label to each hop. Specifically, if this hop is the ingress, the first service controller allocates, from first label space information of this hop, only an outgoing label to this hop; if this hop is the egress, the first service controller allocates, from first label space information of this hop, only an incoming label to this hop; if this hop is a forwarding device except the ingress and the egress, the first service controller allocates, from first label space information of this hop, an incoming label and an outgoing label to this hop at the same time. That the first service controller determines incoming and outgoing interface information of each hop according to topology information of each hop mainly includes: determining, by the first service controller according to the topology information of each hop, an index of an incoming interface, a media access control (MAC) address of the incoming interface, an index of an outgoing interface, a MAC address of the outgoing interface, and like information of each hop.

It can be seen from the foregoing description that the forwarding data of each hop includes label information of each hop and the incoming and outgoing interface information of each hop. The forwarding data of every hop on the LSP from the preset ingress to the preset egress constitutes entire forwarding data of the LSP.

Then the first service controller sends the forwarding data of each hop to the node device corresponding to each hop, so that each node device on the LSP from the preset ingress to the preset egress receives its own forwarding data (generally, the forwarding data is also referred to as a forwarding entry) and then forwards data according to the forwarding data. For example, information in a next hop label forwarding entry (NHLFE) is from the forwarding data sent by the first service controller, mainly including information about an outgoing label and an outgoing interface. For another example, information in an incoming label map (ILM) table is from the forwarding data sent by the first service controller, mainly including information about an incoming label and an incoming interface.

Conventionally, generating forwarding data (mainly referring to label information of each hop) of an LSP is mainly allocating the forwarding data locally by each forwarding device by running a dynamic signaling protocol such as LDP/RSVP-TE, and the forwarding data is sent to an upstream forwarding device of the forwarding device. In this manner of automatic calculation and allocation by using a dynamic protocol, soft state packets such as Hello, Path, and Resv need to be periodically sent between forwarding devices to maintain link status information and LSP status information, which causes heavy burden to the forwarding devices and affects the number of RSVP-TE LSPs that each forwarding device is capable of supporting. A process of creating the forwarding data of the LSP by using the dynamic signaling protocol such as LDP/RSVP-TE is marked as a control plane of the dynamic signaling protocol such as LDP/RSVP-TE, while a process of forwarding data according to the forwarding data is marked as a data plane of the dynamic signaling protocol such as LDP/RSVP-TE. Therefore, in this embodiment, the first service controller creates the forwarding data of the LSP in a centralized manner and sends the forwarding data of each hop on the LSP to each hop on the LSP. Each hop on the LSP may not run the control plane of the dynamic signaling protocol such as LDP/RSVP-TE and only needs to forward the data according to the forwarding data sent by the first service controller, so that the soft state packets such as Hello, Path, and Resv do not need to be periodically sent between the hops on the LSP, which alleviates load of the node devices and helps increase the number of RSVP-TE LSPs that each node device is capable of supporting.

Further, because the forwarding data of the LSP is created by the first service controller in a centralized manner in this embodiment, the first service controller can determine whether to create a unidirectional LSP or a bidirectional LSP in the network as required. For example, after each hop on an LSP is determined (that is, path information is calculated) by using the PCE/CSPF, a unidirectional LSP can be acquired by allocating a label to an incoming interface of each forwarding device. Optionally, on this basis, path information in the other direction may be acquired by reversing the calculated path information and an incoming label is applied for each forwarding device based on the reversed path information to acquire a reverse LSP. For example, it is assumed that an LSP is: a forwarding device A→a forwarding device B→a forwarding device C→a forwarding device D. A reverse LSP acquired is: the forwarding device D→the forwarding device C→the forwarding device B→the forwarding device A.

Optionally, because the forwarding data of the LSP is created by the first service controller in a centralized manner in this embodiment, whether to create a point-to-point (P2P) LSP or a point-to-multipoint (P2MP) LSP in the network may be determined as required. For example, if the PCE/CSPF is used to calculate P2MP path information, in the P2MP path information, one incoming interface may correspond to multiple outgoing interfaces, that is, multiple next hops. Therefore, labels allocated to the multiple next hops correspond to one incoming interface of the node, that is, one ILM corresponds to multiple NHLFEs. Then a P2MP LSP can be acquired.

Optionally, because the forwarding data of the LSP is created by the first service controller in a centralized manner in this embodiment, whether to create a single LSP or two LSPs that have a primary/standby protection relationship may be determined as required, which is more flexible.

In an optional implementation manner of this embodiment, the first service controller determines each hop on a first LSP and a second LSP that have a primary/standby protection relationship from the preset ingress to the preset egress. That is, the first service controller determines to create two LSPs that have a primary/standby protection relationship and determines each hop on each LSP (that is, determines path information of each LSP). Either LSP of the first LSP and the second LSP can be used as a primary LSP and the other as a standby LSP.

In an optional implementation manner of this embodiment, only one service controller, that is, the first service controller, exists in the entire network. Based on the foregoing technical solution of creating two LSPs from the preset ingress to the preset egress, an optional implementation manner of step 102 includes: The first service controller allocates, from first label space information of each hop on the first LSP, a label to each hop on the first LSP, determines incoming and outgoing interface information of each hop on the first LSP according to topology information of each hop on the first LSP, generates forwarding data of each hop on the first LSP, and then sends the forwarding data of each hop on the first LSP to a node device corresponding to each hop on the first LSP to complete establishment of the first LSP; the first service controller allocates, from first label space information of each hop on the second LSP, a label to each hop on the second LSP, determines incoming and outgoing interface information of each hop on the second LSP according to topology information of each hop on the second LSP, generates forwarding data of each hop on the second LSP, and then sends the forwarding data of each hop on the second LSP to a node device corresponding to each hop on the second LSP to complete establishment of the second LSP. It is noted herein that, in this implementation manner, a process in which the first service controller completes establishment of the first LSP and a process in which the first service controller completes establishment of the second LSP may be concurrently executed, which helps improve LSP establishment efficiency.

In the foregoing implementation manner, only one service controller, that is, a first service controller, exists in the network. The first service controller calculates a first LSP and a second LSP from a preset ingress to a preset egress, allocates a label to each hop on the first LSP and the second LSP, determines incoming and outgoing interface information of each hop, generates forwarding data of each hop, and then sends the forwarding data of each hop on the first LSP and the second LSP to a node device corresponding to each hop on the first LSP and the second LSP. In this way, on the one hand, each node device on each LSP can forward data according to the forwarding data sent by the first service controller so that there is no need to periodically send soft state packets such as Hello, Path, and Resv between node devices of the hops on each LSP, which alleviates load of the node devices of the hops and helps increase the number of RSVP-TE LSPs that each node device is capable of supporting; on the other hand, based on the two LSPs that work in mutual backup mode, when one LSP is faulty, a switchover to the other LSP is implemented, which helps improve a success rate of data forwarding. Further, because the first service controller determines each hop on an LSP and calculates forwarding data of each hop in a centralized manner, a user does not need to configure RSVP-TE configurations explicitly on each node device, which simplifies complexity of user configuration and maintainability and alleviates the user's configuration burden.

In an optional implementation manner of this embodiment, two service controllers that have a primary/standby relationship, that is, the first service controller and the second service controller, may be configured in the entire network. In the embodiments of the present invention, the first service controller is used as a primary service controller and the second service controller is used as a standby service controller, but no limitation is posed thereon. Based on the foregoing technical solution of creating two LSPs from the preset ingress to the preset egress, an optional implementation manner of step 102 includes: The first service controller allocates, from first label space information of each hop on the first LSP, a label to each hop on the first LSP, determines incoming and outgoing interface information of each hop on the first LSP according to topology information of each hop on the first LSP, generates forwarding data of each hop on the first LSP, and then sends the forwarding data of each hop on the first LSP to a node device corresponding to each hop on the first LSP to complete establishment of the first LSP. That is, when the first service controller calculates two LSPs from the preset ingress to the preset egress, the first service controller selects one LSP (the first LSP is used as an example in this embodiment) from the two LSPs, allocates a label to each hop on the selected LSP, determines incoming and outgoing interface information of each hop on the selected LSP, forms forwarding data of each hop on the selected LSP, and sends the forwarding data to each hop to complete establishment of the selected LSP. That is, the first service controller is responsible for completing establishment of one LSP.

Based on the foregoing description, the method provided by this embodiment further includes: The first service controller sends identifier information of each hop on the second LSP to the second service controller, so that the second service controller allocates, from second label space information of each hop on the second LSP, a label to each hop on the second LSP, determines incoming and outgoing interface information of each hop on the second LSP according to topology information of each hop on the second LSP, generates forwarding data of each hop on the second LSP, and then sends the forwarding data of each hop on the second LSP to a node device corresponding to each hop on the second LSP to complete establishment of the second LSP. That is, when the first service controller calculates two LSPs from the preset ingress to the preset egress, the first service controller provides identifier information of each hop on the other LSP (that is, path information of the other LSP) for the second service controller. The second service controller is responsible for completing establishment of the other LSP. A process in which the second service controller completes establishment of the other LSP is similar to a process in which the first service controller completes establishment of one LSP of the two LSPs, and details are not described herein again. Here, second label space information of each forwarding device refers to label space information that each forwarding device registers with the second service controller.

It is noted herein that the first label space information and the second label space information of each forwarding device are not overlapped. That is, in a case in which two service controllers exist, the label space information that each forwarding device registers with the first service controller is not intersected with the label space information that each forwarding device registers with the second service controller, which can ensure that labels allocated by the two service controllers to each hop on each LSP do not conflict. However, topology information that each forwarding device registers with the first service controller is the same as topology information that each forwarding device registers with the second service controller.

In the foregoing implementation manner, the first service controller and the second service controller may be connected directly or may be connected indirectly. Further, the first service controller and the second service controller may be indirectly connected through a forwarding device in a network to which the first service controller and the second service controller belong; or the first service controller and the second service controller may also be indirectly connected through another network except the network to which the first service controller and the second service controller belong, that is, the first service controller and the second service controller may traverse another network. For ease of description, in the embodiments of the present invention, the network to which the first service controller and the second service controller belong is called a first network.

In an optional implementation manner of this embodiment, the first service controller and the second service controller may be indirectly connected through the forwarding device in the first network to which the first service controller and the second service controller belong. In this case, each hop on the first LSP and each hop on the second LSP are both node devices in the first network to which the first service controller and the second service controller belong.

In an optional implementation manner of this embodiment, the first service controller and the second service controller may also be indirectly connected through the other network except the first network to which the first service controller and the second service controller belong. In this case, one of the first LSP and the second LSP that are determined by the first service controller from the preset ingress to the preset egress needs to traverse the other network.

If the first LSP is the LSP traversing the other network, an implementation manner of that the first service controller determines each hop on the first LSP from the preset ingress to the preset egress includes: The first service controller determines each hop that is located in the first network on the first LSP from the preset ingress to the preset egress, where the first LSP passes through the other network, that is, a part of node devices on the first LSP are located in the other network. Optionally, the first service controller may further use an algorithm similar to the PCE or CSPF to determine each hop that is located in the first network on the first LSP that passes through the other network. If the first LSP passes through the other network, an exemplary implementation manner is that the first LSP passes through the first service controller and the second service controller, and the first service controller and the second service controller are connected by traversing the other network. Accordingly, an implementation manner of that the first service controller allocates, from first label space information of each hop on the first LSP, a label to each hop on the first LSP, determines incoming and outgoing interface information of each hop on the first LSP according to topology information of each hop on the first LSP, and generates forwarding data of each hop on the first LSP includes: The first service controller triggers establishment of a third LSP, where the third LSP is an LSP that uses the first service controller as an ingress, uses the second service controller as an egress, and passes through the other network, where each hop on the third LSP except the ingress and the egress constitutes each hop that is located in the other network on the first LSP; and then the first service controller allocates, from first label space information of each hop that is located in the first network on the first LSP, a label to each hop that is located in the first network on the first LSP, determines incoming and outgoing interface information of each hop that is located in the first network on the first LSP according to topology information of each hop that is located in the first network on the first LSP, stitches the first LSP and the third LSP, and generates forwarding data of each hop that is located in the first network and each hop that is located in the other network on the first LSP.

A process in which the first service controller triggers establishment of the third LSP may be as follows: All node devices in the other network run a dynamic signaling protocol, for example, RSVP-TE. In this case, the first service controller may complete, by means of using an existing technology, establishment of the third LSP with the second service controller through the node devices in the other network, where a status of the third LSP may be maintained by using the soft state packets such as Hello, Path, and Resv, and the label, incoming and outgoing interface information, and like information of each hop on the third LSP may be locally allocated and sent to a previous hop by each hop by using a Resv packet. A process in which the first service controller establishes the third LSP may further be as follows: The node devices in the other network register their own topology information and first label space information with the first service controller and then the first service controller performs centralized control to complete establishment of the third LSP. A process in which the first service controller controls establishment of the third LSP is the same as a process in which the first service controller controls establishment of the first LSP. Specifically, the first service controller determines each hop on the third LSP, allocates, from first label space information of each hop on the third LSP, a label to each hop on the third LSP, and determines incoming and outgoing interface information of each hop on the third LSP according to topology information of each hop on the third LSP to complete establishment of the third LSP. It is noted herein that the first LSP does not need to concern about other node devices on the third LSP except the first service controller and the second service controller, labels and incoming and outgoing interface information that are allocated to these node devices, or the like, that is, the first LSP does not need to know this information.

The foregoing process in which the first service controller stitches the first LSP and the third LSP includes: The first service controller allocates an incoming label to the ingress (that is, the first service controller) on the third LSP, where the incoming label is an outgoing label of a previous hop of the first service controller on the first LSP, and allocates an outgoing label to the egress (that is, the second service controller) on the third LSP, where the outgoing label is an incoming label of a next hop of the second service controller on the first LSP, and each hop on the third LSP except the first service controller and the second service controller constitutes each hop that is located in the other network on the first LSP.

If the second LSP is the LSP traversing the other network, an implementation manner of that the first service controller determines each hop on the second LSP from the preset ingress to the preset egress includes: The first service controller determines each hop that is located in the first network on the second LSP from the preset ingress to the preset egress, where the second LSP passes through the other network, that is, a part of node devices on the second LSP are located in the other network. Optionally, the first service controller may further use an algorithm similar to the PCE or CSPF to determine each hop that is located in the first network on the second LSP that passes through the other network. If the second LSP passes through the other network, an exemplary implementation manner is that the second LSP passes through the first service controller and the second service controller, and the first service controller and the second service controller are connected by traversing the other network. Accordingly, an implementation manner of that the first service controller sends identifier information of each hop on the second LSP to the second service controller includes: The first service controller triggers establishment of a fourth LSP, where the fourth LSP is an LSP that uses the first service controller as an ingress, uses the second service controller as an egress, and passes through the other network, and each hop on the fourth LSP except the ingress and the egress constitutes each hop that is located in the other network on the second LSP; and then the first service controller sends a stitching and binding relationship between the second LSP and the fourth LSP, identifier information of each hop that is located in the first network on the second LSP, and identifier information of the ingress of the fourth LSP (that is, identifier information of the first service controller) to the second service controller. The stitching and binding relationship between the second LSP and the fourth LSP is indication information used to instruct the second service controller to stitch the second LSP and the fourth LSP. The second service controller may obtain each hop that is located in the first network on the second LSP, according to the identifier information, which is sent by the first service controller, of each hop that is located in the first network on the second LSP, so as to allocate a label to each hop that is located in the first network on the second LSP and determine incoming and outgoing interface information. For the second service controller, it may locally acquire identifier information of the egress of the fourth LSP. Therefore, after receiving the identifier information, which is sent by the first service controller, of the ingress of the fourth LSP, the second service controller can obtain each hop on the fourth LSP (that is, obtain path information of the fourth LSP), so as to acquire the label and incoming and outgoing interface information of each hop on the fourth LSP. The second service controller may stitch, according to the stitching and binding relationship between the second LSP and the fourth LSP, which is sent by the first service controller, the second LSP and the fourth LSP after the label of each hop on the second LSP and the fourth LSP is determined, and generate forwarding data of each hop that is located in the first network and each hop that is located in the any other network on the second LSP. A process in which the first service controller establishes the fourth LSP is similar to a process in which the first service controller establishes the third LSP, and details are not described herein again.

The foregoing process in which the second service controller stitches the second LSP and the fourth LSP includes: The second service controller allocates an incoming label to the ingress (that is, the first service controller) on the fourth LSP, where the incoming label is an outgoing label of a previous hop of the first service controller on the second LSP, and allocates an outgoing label to the egress (that is, the second service controller) on the fourth LSP, where the outgoing label is an incoming label of a next hop of the second service controller on the second LSP, and each hop on the fourth LSP except the first service controller and the second service controller constitutes each hop that is located in the other network on the second LSP.

In an optional implementation manner of this embodiment, the first service controller may further send identifier information of each hop on the first LSP to the second service controller for backup. In this way, when the first service controller or the first LSP is faulty, the second service controller can perform rerouting according to the stored identifier information of each hop on the first LSP, to prevent a new LSP from being the same as the first LSP, so as to maximally increase an LSP convergence speed.

It is noted herein that the foregoing identifier information of each hop may be an IP address of each hop and like information, which may uniquely identify an incoming interface and an outgoing interface of a forwarding device corresponding to each hop. In the foregoing implementation manner, a first service controller calculates each hop on a first LSP and a second LSP from a preset ingress to a preset egress. Then the first service controller and a second service controller respectively allocate a label to each hop on the first LSP and the second LSP, determine incoming and outgoing interface information of each hop, generate forwarding data of each hop, and then send the forwarding data of each hop on the first LSP and the second LSP to a node device corresponding to each hop on the first LSP and the second LSP. In this way, on the one hand, each node device on each LSP can forward data according to the received forwarding data so that there is no need to periodically send soft state packets such as Hello, Path, and Resv between node devices of the hops on each LSP, which alleviates load of the node devices of the hops and helps increase the number of RSVP-TE LSPs that each node device is capable of supporting; on the other hand, based on the two LSPs that work in mutual backup mode, when one LSP is faulty, a switchover to the other LSP is implemented, which helps improve a success rate of data forwarding. Further, because the first service controller or the second service controller determines each hop on an LSP and calculates forwarding data of each hop in a centralized manner, a user does not need to configure RSVP-TE configurations explicitly on each node device, which simplifies complexity of user configuration and maintainability and alleviates the user's configuration burden.

Figure 2:
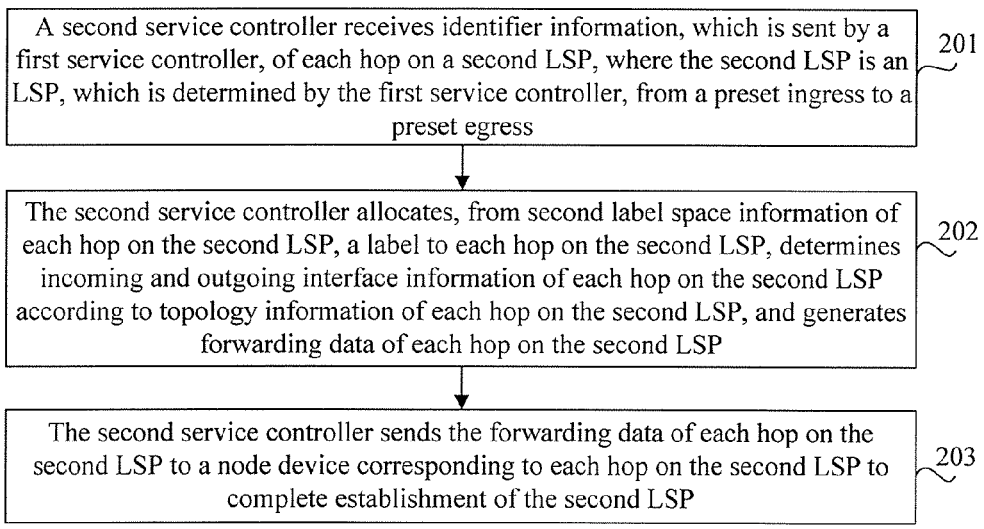
FIG. 2 is a flowchart of an LSP establishment method according to another embodiment of the present invention.

FIG. 2 is a flowchart of an LSP establishment method provided by another embodiment of the present invention. In this embodiment, a first service controller and a second service controller exist in a network at the same time, and the first service controller and the second service controller work in hot backup mode. As shown in FIG. 2, the method provided by this embodiment includes:

Step 201: The second service controller receives identifier information, which is sent by the first service controller, of each hop on a second LSP, where the second LSP is an LSP, which is determined by the first service controller, from a preset ingress to a preset egress.

Specifically, the first service controller determines each hop on two LSPs from the preset ingress to the preset egress, that is, each hop on a first LSP and the second LSP. Optionally, the first service controller may use an algorithm similar to a PCE algorithm, a CSFP algorithm, or the like to separately determine each hop on the first LSP and the second LSP, where the first LSP and the second LSP have a primary/standby relationship. Then the first service controller sends the identifier information of each hop on the second LSP to the second service controller, so that the second service controller is responsible for completing establishment of the second LSP. The first service controller is responsible for completing establishment of the first LSP.

For a process in which the first service controller is responsible for completing establishment of the first LSP, reference may be made to descriptions in the foregoing embodiment.

Step 202: The second service controller allocates, from second label space information of each hop on the second LSP, a label to each hop on the second LSP, determines incoming and outgoing interface information of each hop on the second LSP according to topology information of each hop on the second LSP, and generates forwarding data of each hop on the second LSP.

After receiving the identifier information of each hop on the second LSP, the second service controller can determine each hop on the second LSP (that is, determine path information of the second LSP). Then the second service controller allocates, from the second label space information of each hop on the second LSP, a label to each hop on the second LSP, determines the incoming and outgoing interface information of each hop on the second LSP according to the topology information of each hop on the second LSP, and generates the forwarding data of each hop on the second LSP. That the second service controller allocates, from the second label space information of each hop on the second LSP, a label to each hop on the second LSP includes: allocating an incoming label and/or an outgoing label to each hop. Specifically, if this hop is an ingress on the second LSP, the second service controller allocates, from second label space information of this hop, an outgoing label to this hop; if this hop is an egress on the second LSP, the second service controller allocates, from second label space information of this hop, an incoming label to this hop; if this hop is another forwarding device on the second LSP except the ingress and the egress, the second service controller allocates, from second label space information of this hop, an incoming label and an outgoing label to this hop at the same time. That the second service controller determines incoming and outgoing interface information of each hop on the second LSP according to topology information of each hop on the second LSP mainly includes: determining, by the second service controller according to the topology information of each hop on the second LSP, an index of an incoming interface, a MAC address of the incoming interface, an index of an outgoing interface, a MAC address of the outgoing interface, and like information of each hop on the second LSP.

It can be seen from the foregoing description that the forwarding data of each hop on the second LSP includes label information and the incoming and outgoing interface information of each hop. The forwarding data of each hop on the second LSP constitutes complete forwarding data of the second LSP.

In an optional implementation manner of this embodiment, before step 201, the method includes: receiving, by the second service controller, registration information sent by each forwarding device in a network to which the second service controller belongs, where the registration information includes topology information of the forwarding device and second label space information of the forwarding device. The second label space information of each forwarding device refers to label space information that each forwarding device registers with the second service controller. Each forwarding device may further include other label space information, for example, first label space information registered with the first service controller. The first label space information and the second label space information of each forwarding device are not intersected or overlapped.

Step 203: The second service controller sends the forwarding data of each hop on the second LSP to a node device corresponding to each hop on the second LSP to complete establishment of the second LSP.

The second service controller sends the forwarding data of each hop on the second LSP to the node device corresponding to each hop on the second LSP, so that after receiving its own forwarding data, each node device on the second LSP can forward data according to the received forwarding data. The forwarding data may include various types of information in an NHLFE and/or an ILM.

It is noted herein that, when the first LSP and the second LSP exist in the network at the same time, the first LSP is preferably used for data forwarding, and data forwarding is switched to the second LSP when the first LSP is faulty, which does not affect a forwarding plane and can improve a success rate of data forwarding. An ingress of the first LSP (that is, the ingress of the second LSP) detects a status of the first service controller. When it is discovered that the first service controller is faulty, data forwarding is switched to the second LSP and the second service controller is upgraded to a primary control server. Optionally, after a fault of the first service controller is rectified, the ingress on the first LSP can perform control again to upgrade the first service controller to the primary control server. When the fault of the first service controller cannot be rectified or is still not rectified after a preset time, each hop on the first LSP can delete, according to aging time, forwarding data corresponding to the first LSP.

It can be seen from the foregoing description that, in a case in which two service controllers having a primary/standby relationship, that is, a first service controller and a second service controller, are configured in a network, after the first service controller determines each hop on two LSPs having a primary/standby relationship, that is, a first LSP and a second LSP, the first service controller and the second service controller are respectively responsible for determining forwarding data of each hop on the first LSP and the second LSP and sending the forwarding data of each hop to a node device corresponding to each hop to complete establishment of the first LSP and the second LSP. In this way, on the one hand, each node device on each LSP can forward data according to the received forwarding data so that there is no need to periodically send soft state packets such as Hello, Path, and Resv between node devices of the hops on each LSP, which alleviates load of the node devices of the hops and helps increase the number of RSVP-TE LSPs that each node device is capable of supporting; on the other hand, based on the two LSPs that work in mutual backup mode, when one LSP is faulty, a switchover to the other LSP is implemented, which helps improve a success rate of data forwarding. Further, because the first service controller or the second service controller determines each hop on an LSP and calculates forwarding data of each hop in a centralized manner, a user does not need to configure RSVP-TE configurations explicitly on each node device, which simplifies complexity of user configuration and maintainability and alleviates the user's configuration burden.

The first service controller and the second service controller may be connected directly or may be connected indirectly. Further, the first service controller and the second service controller may be indirectly connected through another forwarding device in a first network to which the first service controller and the second service controller belong, or may be indirectly connected through another network except the first network to which the first service controller and the second service controller belong.

In an optional implementation manner of this embodiment, the first service controller and the second service controller are connected through the other network except the first network to which the first service controller and the second service controller belong. In this case, an optional implementation manner of step 201 includes: The second service controller receives, from the first service controller, a stitching and binding relationship between the second LSP and a fourth LSP, identifier information of each hop that is located in the first network on the second LSP, and identifier information of an ingress (that is, the first service controller) of the fourth LSP. The stitching and binding relationship between the second LSP and the fourth LSP is indication information used to instruct the second service controller to stitch the second LSP and the fourth LSP. The fourth LSP is an LSP that is established by the first service controller, uses the first service controller as the ingress, uses the second service controller as an egress, and passes through the other network, where each hop on the fourth LSP constitutes each hop that is located in the other network on the second LSP. For a process in which the first service controller establishes the fourth LSP, reference may be made to descriptions of a process in which the first service controller establishes the third LSP in the foregoing embodiment.

Based on the foregoing description, an optional implementation manner of step 202 includes: The second service controller allocates, from second label space information of each hop that is located in the first network on the second LSP, a label to each hop that is located in the first network on the second LSP, determines incoming and outgoing interface information of each hop that is located in the first network on the second LSP according to topology information of each hop that is located in the first network on the second LSP, stitches the second LSP and the fourth LSP, and generates forwarding data of each hop that is located in the first network and each hop that is located in the other network on the second LSP. Specifically, the second service controller may obtain, according to the identifier information, which is sent by the first service controller, of each hop that is located in the first network on the second LSP, each hop that is located in the first network on the second LSP, so as to allocate the label to each hop that is located in the first network on the second LSP and determine the incoming and outgoing interface information. For the second service controller, it may locally acquire identifier information of the egress of the fourth LSP. Therefore, after receiving the identifier information, which is sent by the first service controller, of the ingress of the fourth LSP, the second service controller can obtain each hop on the fourth LSP (that is, obtain path information of the fourth LSP), so as to acquire the label and incoming and outgoing interface information of each hop on the fourth LSP. The second service controller may stitch, according to the stitching and binding relationship between the second LSP and the fourth LSP, which is sent by the first service controller, the second LSP and the fourth LSP after the label of each hop on the second LSP and the fourth LSP is determined, and generate the forwarding data of the second LSP.

The foregoing process in which the second service controller stitches the second LSP and the fourth LSP includes: The second service controller allocates an incoming label to the ingress (that is, the first service controller) on the fourth LSP, where the incoming label is an outgoing label of a previous hop of the first service controller on the second LSP, and allocates an outgoing label to the egress (that is, the second service controller) on the fourth LSP, where the outgoing label is an incoming label of a next hop of the second service controller on the second LSP, and each hop on the fourth LSP except the first service controller and the second service controller constitutes each hop that is located in the other network on the second LSP.

In an optional implementation manner of this embodiment, the second service controller may further receive identifier information, which is sent by the first service controller, of each hop on the first LSP and store the identifier information of each hop on the first LSP. The first LSP is the other LSP determined by the first service controller from the preset ingress to the preset egress, and the first LSP and the second LSP have the primary/standby protection relationship. In this way, when the first service controller is faulty or the first LSP is faulty, the second service controller can perform rerouting according to the stored identifier information of each hop on the first LSP, to prevent a new route from being the same as the first LSP, so as to maximally increase an LSP convergence speed.

In the foregoing implementation manner, a first service controller calculates each hop on a first LSP and a second LSP from a preset ingress to a preset egress. Then the first service controller and a second service controller respectively allocate a label to each hop on the first LSP and the second LSP, determine incoming and outgoing interface information of each hop, generate forwarding data of each hop, and then send the forwarding data of each hop on the first LSP and the second LSP to a node device corresponding to each hop on the first LSP and the second LSP. In this way, on the one hand, the node device of each hop on each LSP can forward data according to the received forwarding data so that there is no need to periodically send soft state packets such as Hello, Path, and Resv between node devices of the hops on each LSP, which alleviates load of the node devices of the hops and helps increase the number of RSVP-TE LSPs that each node device is capable of supporting; on the other hand, based on the two LSPs that work in mutual backup mode, when one LSP is faulty, a switchover to the other LSP is implemented, which helps improve a success rate of data forwarding. Further, because the first service controller or the second service controller determines each hop on an LSP and calculates forwarding data of each hop in a centralized manner, a user does not need to configure RSVP-TE configurations explicitly on each node device, which simplifies complexity of user configuration and maintainability and alleviates the user's configuration burden.

Figure 3:
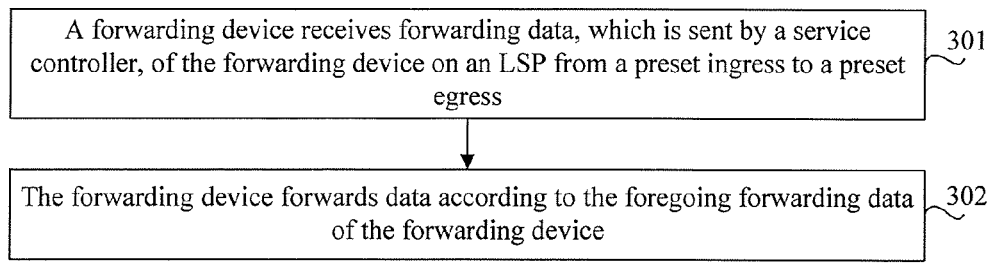
FIG. 3 is a flowchart of a data forwarding method according to an embodiment of the present invention.

FIG. 3 is a flowchart of a data forwarding method provided by an embodiment of the present invention. As shown in FIG. 3, the method provided by this embodiment includes:

Step 301: A forwarding device receives forwarding data, which is sent by a service controller, of the forwarding device on an LSP from a preset ingress to a preset egress.

The forwarding data of the forwarding device includes a label that the service controller allocates to the forwarding device from label space information of the forwarding device, and incoming and outgoing information that the service controller determines for the forwarding device according to topology information of the forwarding device.

Step 302: The forwarding device forwards data according to the foregoing forwarding data of the forwarding device.

In an optional implementation manner of this embodiment, the service controller includes a first service controller and/or a second service controller; the LSP includes a first LSP and/or a second LSP of two LSPs that have a primary/standby protection relationship, where each hop on the first LSP is determined by the first service controller and each hop on the second LSP is determined by the first service controller and provided for the second service controller; and accordingly, the label space information of the forwarding device includes first label space information and/or second label space information.

Specifically, if the service controller is the first service controller, the LSP refers to the first LSP and the label space information of the forwarding device is the first label space information. In this case, step 301 is specifically as follows: The forwarding device receives forwarding data, which is sent by the first service controller, of the forwarding device on the first LSP from the preset ingress to the preset egress. The forwarding device is a hop on the first LSP, and the forwarding data of the forwarding device includes a label that the first service controller allocates to the forwarding device from the first label space information of the forwarding device, and incoming and outgoing interface information that the first service controller determines for the forwarding device according to the topology information of the forwarding device.

If the service controller is the second service controller, the LSP is the second LSP and the label space information of the forwarding device is the second label space information. In this case, step 301 is specifically as follows: The forwarding device receives forwarding data, which is sent by the second service controller, of the forwarding device on the second LSP from the preset ingress to the preset egress. The forwarding device is a hop on the second LSP, and the forwarding data of the forwarding device includes a label that the second service controller allocates to the forwarding device from the second label space information of the forwarding device, and incoming and outgoing interface information that the second service controller determines for the forwarding device according to the topology information of the forwarding device.

In addition, if the forwarding device is the preset ingress or the preset egress and two service controllers having a primary/standby relationship, that is, the first service controller and the second service controller, are configured in a network at the same time, the forwarding device receives forwarding data of the forwarding device, which is sent by the first service controller and the second service controller at the same time. Specifically, the forwarding device receives forwarding data, which is sent by the first service controller, of the forwarding device on the first LSP and also receives forwarding data, which is sent by the second service controller, of the forwarding device on the second LSP. The forwarding data, which is sent by the first service controller, of the forwarding device includes: a label that the first service controller allocates to the forwarding device from the first label space information of the forwarding device, and incoming and outgoing interface information that the first service controller determines for the forwarding device according to the topology information of the forwarding device. The forwarding data, which is sent by the second service controller, of the forwarding device includes: a label that the second service controller allocates to the forwarding device from the second label space information of the forwarding device, and incoming and outgoing interface information that the second service controller determines for the forwarding device according to the topology information of the forwarding device.

It can be seen from the foregoing description that, if the forwarding device provided by this embodiment is located on the first LSP, data forwarding can be performed according to the forwarding data, which is sent by the first service controller, of the forwarding device on the first LSP; if the forwarding device provided by this embodiment is located on the second LSP, data forwarding can be performed according to the forwarding data, which is sent by the second service controller, of the forwarding device on the second LSP.

In an optional implementation manner of this embodiment, before step 301, the method includes: the forwarding device sends first registration information to the first service controller, where the first registration information includes the topology information of the forwarding device and the first label space information of the forwarding device; and the forwarding device sends second registration information to the second service controller, where the second registration information includes the topology information of the forwarding device and the second label space information of the forwarding device.

In an optional implementation manner of this embodiment, if the forwarding device is the preset ingress, an optional implementation manner of step 302 includes: The forwarding device separately forwards the data according to the forwarding data of the forwarding device on the first LSP and the forwarding data of the forwarding device on the second LSP. In a case in which the first service controller is not faulty, the forwarding device preferably chooses to forward the data according to the forwarding data of the forwarding device on the first LSP. When it is monitored that the first service controller is faulty, the forwarding device forwards the data according to the forwarding data of the forwarding device on the second LSP, that is, data forwarding is switched from the first LSP to the second LSP, which improves a success rate of data forwarding.

It can be seen from the foregoing description that, in the data forwarding method provided by this embodiment, a forwarding device and another forwarding device do not need to send soft state packets such as Hello, Path, and Resv to each other, and data can be forwarded according to received forwarding data, which ensures light load of the forwarding device and increases the number of RSVP-TE LSPs that the forwarding device is capable of supporting. In addition, because a service controller determines each hop on an LSP and calculates forwarding data of each hop in a centralized manner, a user does not need to configure RSVP-TE configurations explicitly on a forwarding device, which simplifies complexity of user configuration and maintainability and alleviates the user's configuration burden.

Figure 4A:
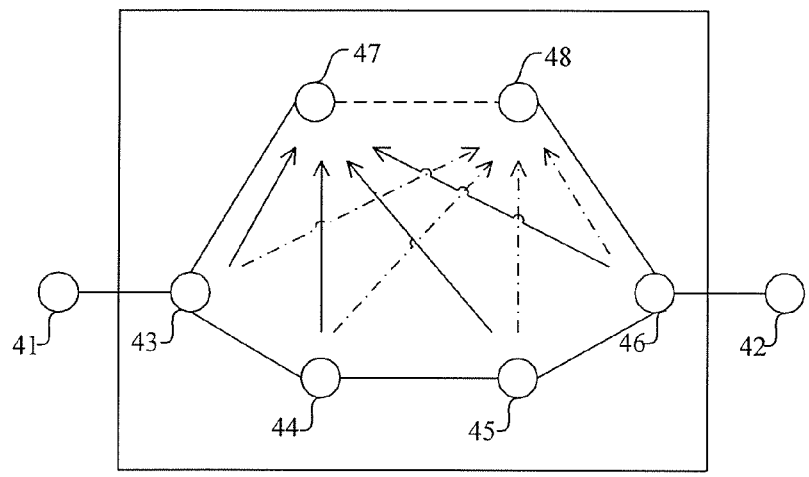
FIG. 4A to FIG. 4D are schematic diagrams of an LSP establishment method according to an embodiment of the present invention.

The following uses a virtual cluster system shown in FIG. 4A as an example to describe a process of an LSP establishment method provided by the present invention. As shown in FIG. 4A, the virtual cluster system includes: a node 41, a node 42, a forwarding device 43, a forwarding device 44, a forwarding device 45, a forwarding device 46, a first service controller 47, and a second service controller 48. The node 41 is connected to the forwarding device 43; the forwarding device 43 is further connected to the forwarding device 44 and the first service controller 47; the forwarding device 44 is further connected to the forwarding device 45; the forwarding device 45 is further connected to the forwarding device 46; the forwarding device 46 is further connected to the node 42 and the second service controller 48; and the first service controller 47 is connected to the second service controller 48. As shown in FIG. 4A, the first service controller 47 is connected to the second service controller 48 by using a dashed line, which indicates that the first service controller 47 and the second service controller 48 may be connected directly or may be connected indirectly. In this embodiment, it is assumed that the first service controller 47 and the second service controller 48 are connected directly. It is assumed that a preset ingress is the forwarding device 43 and a preset egress is the forwarding device 46.

Step 1: Each forwarding device registers with the service controllers. As shown in FIG. 4A, each of the forwarding devices 43 to 46 sends first registration information (represented by a solid line with an arrow in FIG. 4A) to the first service controller 47, and each of the forwarding devices 43 to 46 sends second registration information (represented by a dash-dotted line with an arrow in FIG. 4A) to the second service controller 48. The first registration information sent by the forwarding devices 43 to 46 includes their own first label space information and topology information. The second registration information sent by the forwarding devices 43 to 46 includes their own second label space information and topology information. The first label space information is not intersected with the second label space information.

It is noted herein that, if there is only one service controller in the virtual cluster system, the forwarding devices need to register only with the service controller.

Figure 4B:
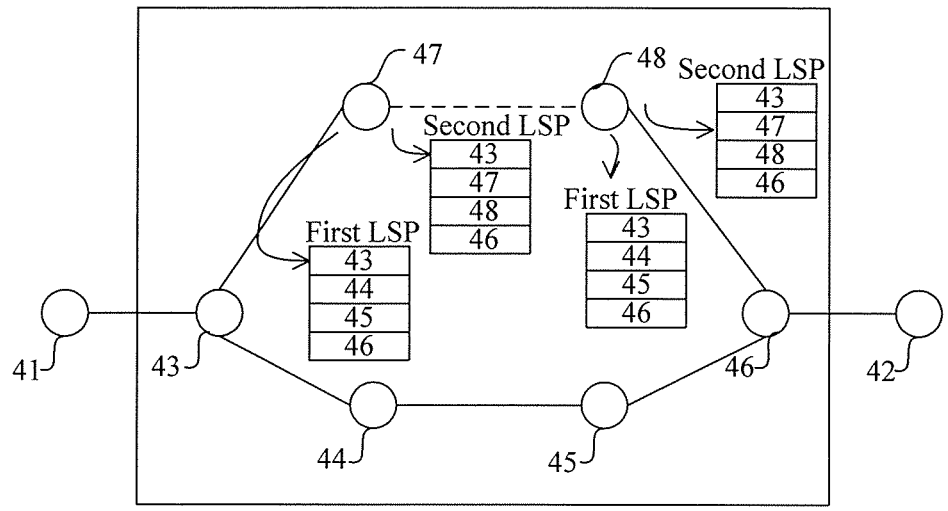

Step 2: The service controllers calculate path information of an LSP, that is, determine each hop on the LSP. As shown in FIG. 4B, the first service controller 47 uses an algorithm mechanism similar to a PCE algorithm, a CSPF algorithm, or the like to calculate two LSPs having a primary/standby protection relationship, that is, a first LSP and a second LSP, for the virtual cluster system. As shown in FIG. 4B, path information of the first LSP includes: the forwarding device 43→the forwarding device 44→the forwarding device 45→the forwarding device 46, and path information of the second LSP includes: the forwarding device 43→the first service controller 47→the second service controller 48→the forwarding device 46.

It is noted herein that the first service controller 47 may also calculate an LSP from the forwarding device 43 to the forwarding device 46 for the virtual cluster system.

As shown in FIG. 4B, the first service controller 47 synchronizes the path information of the first LSP and the path information of the second LSP to the second service controller 48.

Figure 4C:
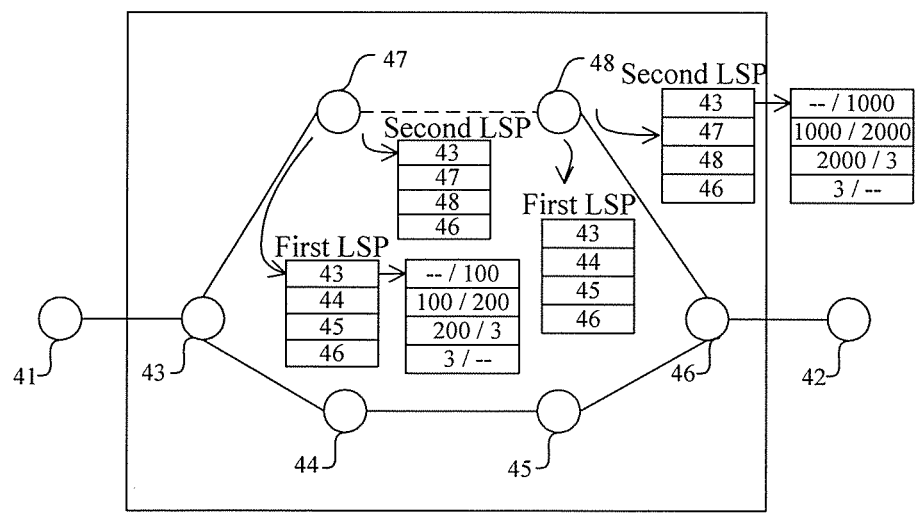

Step 3: The service controllers allocate a label to each Hop (that is, each hop) and generate complete forwarding data of the LSPs. The first service controller 47 allocates a label to each Hop on the first LSP, determines incoming and outgoing interface information of each Hop, generates forwarding data of each Hop, and constitutes complete forwarding data of the first LSP by using the forwarding data of all Hops. In this embodiment, only the label of each Hop is shown. In this case, the complete forwarding data of the first LSP is shown in FIG. 4C. In the same way, the second service controller 48 allocates a label to each Hop on the second LSP, determines incoming and outgoing interface information of each Hop, generates forwarding data of each Hop, and constitutes complete forwarding data of the second LSP by using the forwarding data of all Hops. In this embodiment, only the label of each Hop is shown. In this case, the complete forwarding data of the second LSP is shown in FIG. 4C.

Figure 4D:
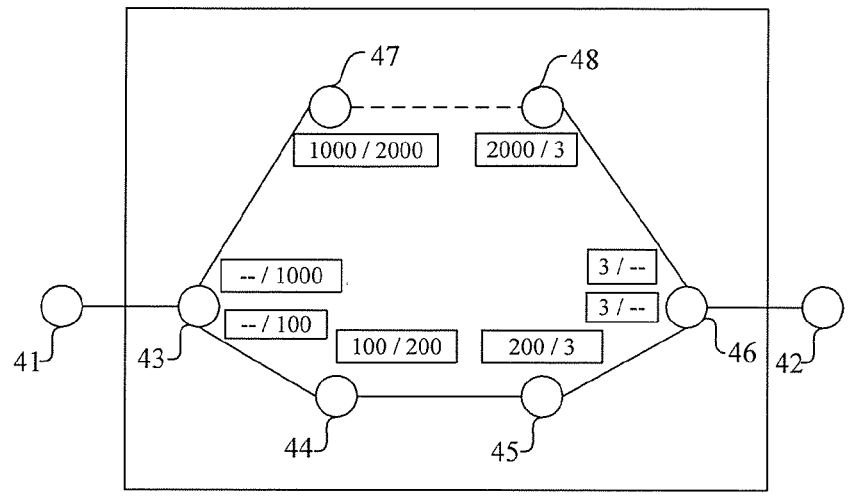

Step 4: The service controllers send the forwarding data, which is corresponding to each Hop, in the complete forwarding data of the LSPs to a forwarding device corresponding to this Hop. The first service controller 47 splits the complete forwarding data of the first LSP, which is calculated in step 3, according to the forwarding devices and sends forwarding data that belongs to each forwarding device to the corresponding forwarding device. A final delivery result is shown in FIG. 4D, that is, the first service controller 47 sends "--/100" to the forwarding device 43, sends "100/200" to the forwarding device 44, sends "200/3" to the forwarding device 45, and sends "3/--" to the forwarding device 46. In the same way, the second service controller 48 splits the complete forwarding data of the second LSP, which is calculated in step 3, according to the forwarding devices and sends forwarding data that belongs to each forwarding device to the corresponding forwarding device. A final delivery result is shown in FIG. 4D, that is, the second service controller 48 sends "--/1000" to the forwarding device 43, sends "1000/2000" to the first service controller 47, sends "2000/3" to the second service controller 48, and sends "3/--" to the forwarding device 46.

For the forwarding devices, they only need to directly forward, after receiving the forwarding data sent by the service controllers, data on a forwarding plane according to the forwarding data. It can be seen that the forwarding devices do not need to run a control plane any longer and only need to run the forwarding plane, and unlike the conventional solution, there is no need to send soft state packets such as Hello, Path, and Resv, thereby alleviating burden and supporting more RSVP-TE LSPs.

Optionally, as a primary service controller (Primary Controller), the first service controller 47 controls establishment of the first LSP and the second LSP in the virtual cluster system. After the first service controller 47 is faulty, the forwarding plane is not affected and traffic is switched to the second LSP. If a fault of the first service controller 47 cannot be rectified, the forwarding devices 43 to 46 can age and delete, on their own, forwarding data that belongs to the first service controller 47 on the first LSP. In addition, after the first service controller 47 is faulty, the forwarding device 43 can perform control to upgrade the second service controller 48 that is used as a standby service controller (Standby Controller) to a new primary service controller.

In this embodiment, on a basis that a control plane is separated from a forwarding plane, a service controller is used to generate forwarding data in a centralized manner and a forwarding device does not need to run the control plane so that the forwarding device is freed and dedicated to data forwarding. The following beneficial effects are achieved compared with the conventional solution: 1. The service controller calculates complete forwarding data of an LSP in a centralized manner, and only corresponding forwarding data and some other necessary link information are transmitted between the service controller and the forwarding device, which saves system resources occupied by running a dynamic signaling protocol. The saved resources may be used to support more LSP forwarding, thereby improving an MPLS forwarding capability that the forwarding device is capable of supporting and increasing the number of MPLS LSPs that the forwarding device is capable of supporting. 2. The service controller performs centralized control to generate the complete forwarding data of the LSP, which further improves manageability of a user for the MPLS LSPs, can better make a policy with respect to LSPs, and further decreases network operation and maintenance costs.

Figure 5A:
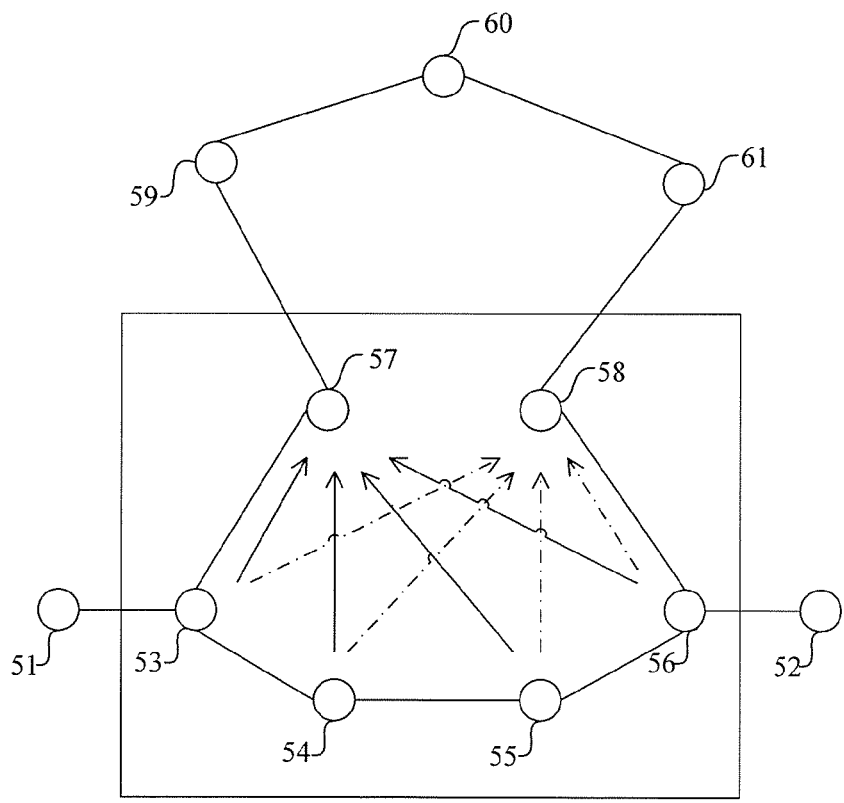
FIG. 5A to FIG. 5F are schematic diagrams of an LSP establishment method according to another embodiment of the present invention.

The following uses a network composed of a virtual cluster system shown in FIG. 5A as an example to describe a process of an LSP establishment method provided by the present invention. As shown in FIG. 5A, the network includes: a node 51, a node 52, a forwarding device 53, a forwarding device 54, a forwarding device 55, a forwarding device 56, a first service controller 57, a second service controller 58, a node 59, a node 60, and a node 61, where the node 51, the node 52, the forwarding device 53, the forwarding device 54, the forwarding device 55, the forwarding device 56, the first service controller 57, and the second service controller 58 belong to the same virtual cluster system, while the node 59, the node 60, and the node 61 belong to a node outside the virtual cluster system. As shown in FIG. 5A, the node 51 is connected to the forwarding device 53; the forwarding device 53 is further connected to the forwarding device 54 and the first service controller 57; the forwarding device 54 is further connected to the forwarding device 55; the forwarding device 55 is further connected to the forwarding device 56; the forwarding device 56 is further connected to the node 52 and the second service controller 58; the first service controller 57 is further connected to the node 59; the node 59 is further connected to node 60; the node 60 is further connected to node 61; and the node 61 is further connected to the second service controller 58. In this embodiment, the first service controller 57 and the second service controller 58 are connected through the node 59, the node 60, and the node 61. The node 59, the node 60, and the node 61 do not belong to the virtual cluster system to which the first service controller 57 and the second service controller 58 belong, that is, the first service controller 57 and the second service controller 58 are connected by traversing another network. It is assumed that a preset ingress is the forwarding device 53 and a preset egress is the forwarding device 56.

Step 1: Each of the forwarding devices registers with the service controllers. As shown in FIG. 5A, the forwarding devices 53 to 56 send first registration information (represented by a solid line with an arrow in FIG. 5A) to the first service controller 57, and the forwarding devices 53 to 56 send second registration information (represented by a dashed line with an arrow in FIG. 5A) to the second service controller 58. The first registration information sent by the forwarding devices 53 to 56 includes their own first label space information and topology information. The second registration information sent by the forwarding devices 53 to 56 includes their own second label space information and topology information. The first label space information is not intersected with the second label space information.

It is noted herein that, if there is only one service controller in the virtual cluster system, the forwarding devices need to register only with the service controller.

Figure 5B:
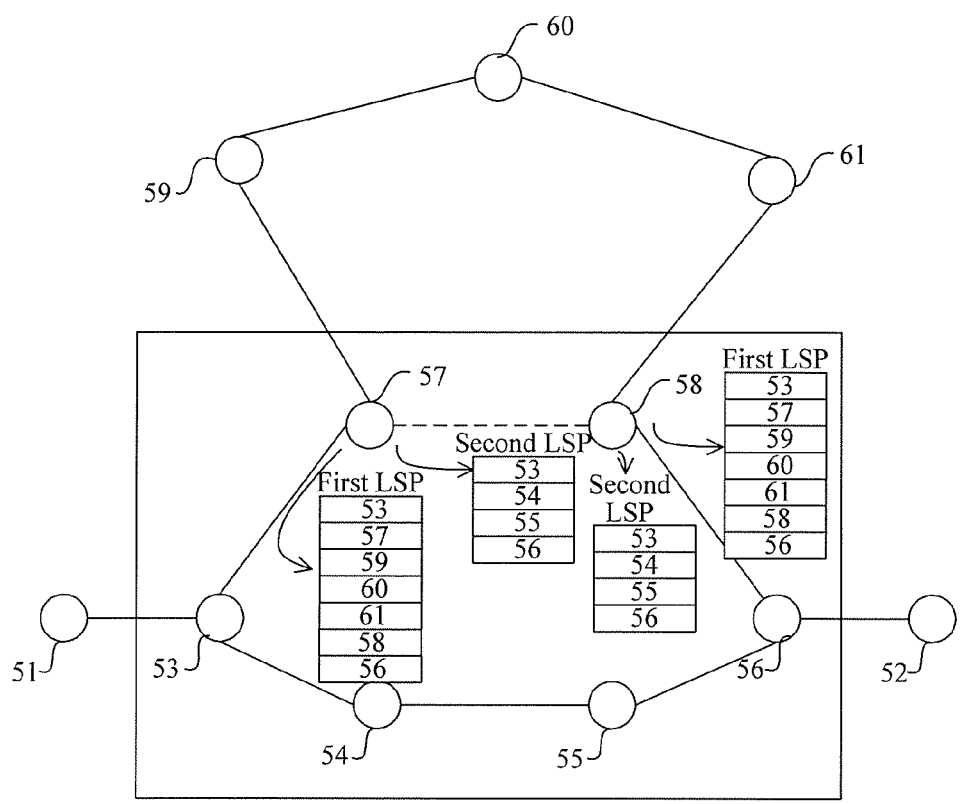

Step 2: The service controllers calculate path information of an LSP, that is, determine each hop on the LSP. As shown in FIG. 5B, the first service controller 57 uses an algorithm mechanism similar to a PCE algorithm, a CSPF algorithm, or the like to calculate two LSPs having a primary/standby protection relationship, that is, a first LSP and a second LSP, for the virtual cluster system. As shown in FIG. 5B, path information of the first LSP includes: the forwarding device 53→the first service controller 57→the node 59→the second service controller 58→the forwarding device 56. In this case, the first service controller 57 determines only nodes that are located in the virtual cluster system on the first LSP and does not concern about nodes that traverse the other network. Path information of the second LSP includes: the forwarding device 53→the forwarding device 54→the forwarding device 55→the forwarding device 56.

It is noted herein that the first service controller 47 may also calculate an LSP from the forwarding device 53 to the forwarding device 56 for the virtual cluster system.

As shown in FIG. 5B, the first service controller 57 synchronizes the path information of the first LSP and the path information of the second LSP to the second service controller 58.

Figure 5C:
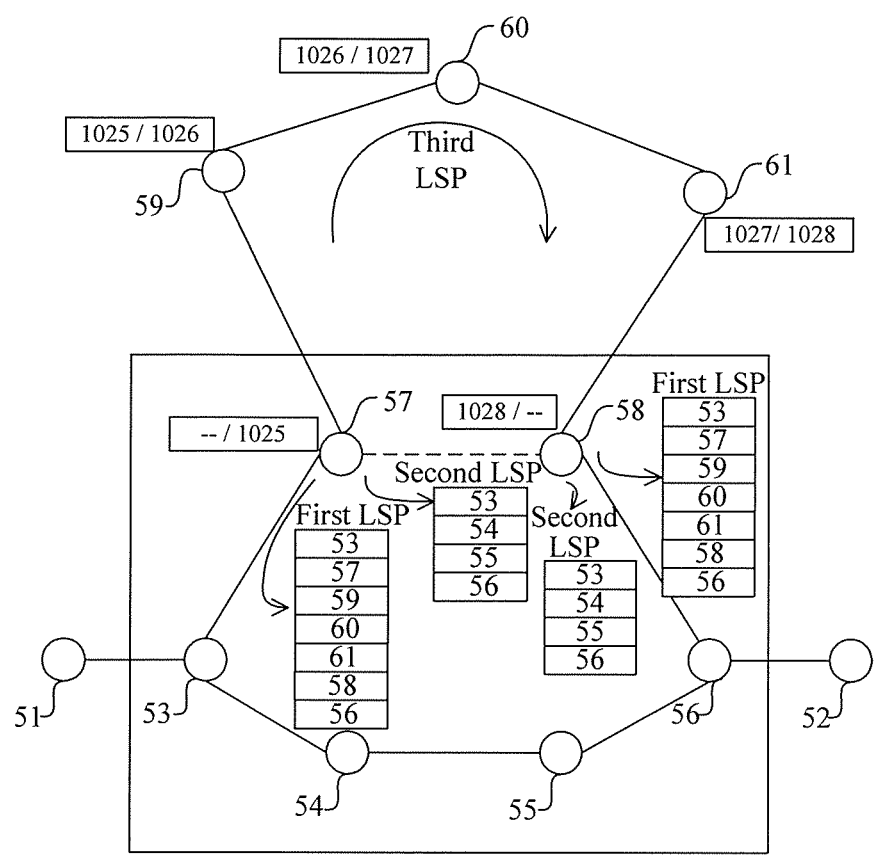

Step 3: The server controllers trigger establishment of an LSP outside a domain. As shown in FIG. 5C, the first service controller 57 does not allocate a label to each hop on the first LSP immediately but triggers a dynamic signaling protocol to establish a third LSP that traverses an external network. The third LSP uses the first service controller 57 as an ingress, uses the second service controller 58 as an egress, and passes through the node 59, the node 60, and the node 61, as shown in an arc with an arrow in FIG. 5C. Labels of the first service controller 57, the node 59, the node 60, the node 61, and the second service controller 58 may be locally allocated on their own and sent to their previous hops by using a Resv packet. Respective labels are shown in FIG. 5C.

Figure 5D:
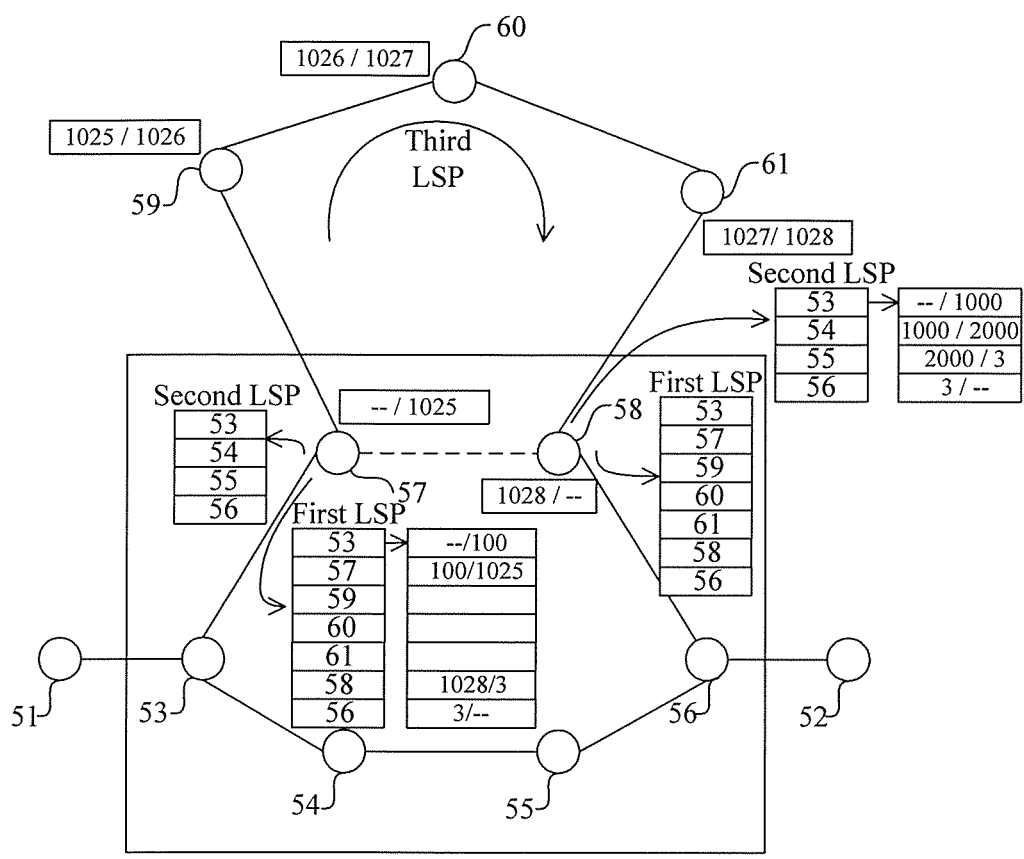

Step 4: The service controllers allocate a label to each Hop and generate complete forwarding data of the LSPs. The first service controller 57 allocates a label to each Hop that is located in the virtual cluster system on the first LSP, determines incoming and outgoing interface information of each Hop, stitches the first LSP and the third LSP, generates forwarding data of each Hop that is located in the virtual cluster system and each Hop that is located outside the virtual cluster system on the first LSP, and constitutes complete forwarding data of the first LSP by using the forwarding data of all Hops. In this embodiment, only the label of each Hop is shown. In this case, the complete forwarding data of the first LSP is shown in FIG. 5D. A result of stitching the first LSP and the third LSP is: The first service controller 57 is assigned an incoming label as the ingress of the third LSP, where the incoming label is an outgoing label 1025 of the forwarding device 53 and the forwarding device 53 on the first LSP is an upstream node of the first service controller 57; and the second service controller is assigned an outgoing label as the egress of the third LSP, where the outgoing label is an incoming label 3 of the forwarding device 56 and the forwarding device 56 on the first LSP is a downstream node of the second service controller 58. In the same way, the second service controller 58 allocates a label to each Hop on the second LSP, determines incoming and outgoing interface information of each Hop, generates forwarding data of each Hop, and constitutes complete forwarding data of the second LSP by using the forwarding data of all Hops. In this embodiment, only the label of each Hop is shown. In this case, the complete forwarding data of the second LSP is shown in FIG. 5D.

Figure 5E:
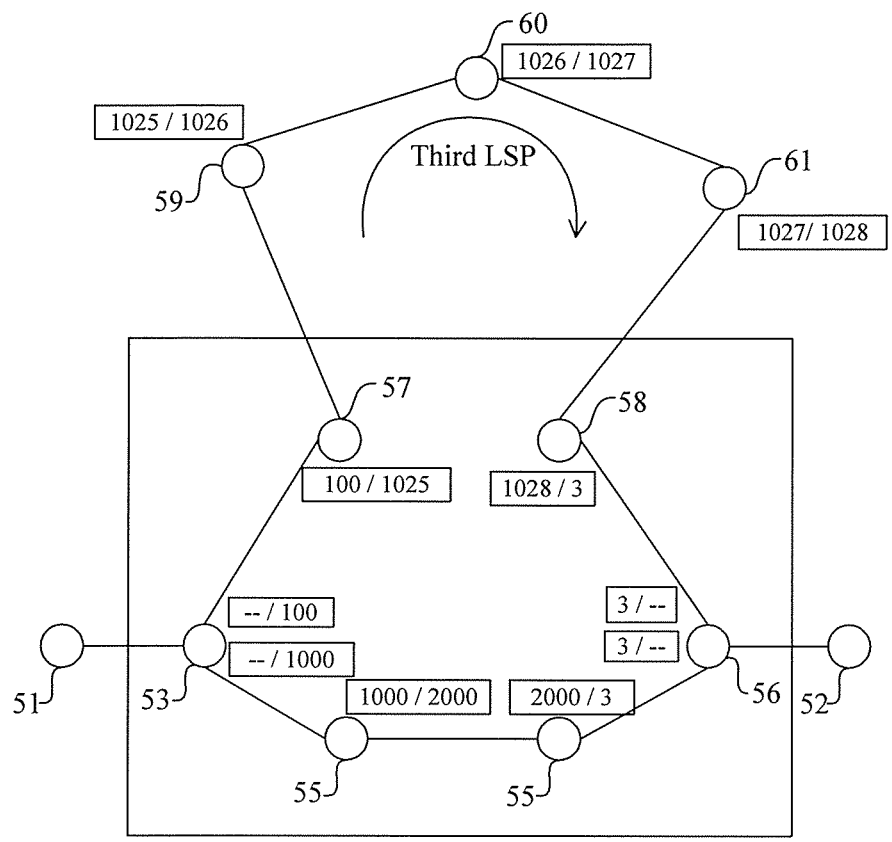

Step 5: The service controllers send the forwarding data, which is corresponding to each Hop, in the complete forwarding data of the LSPs to a forwarding device corresponding to this Hop. The first service controller 57 splits the complete forwarding data of the first LSP, which is calculated in step 4, according to the forwarding devices and sends forwarding data that belongs to each forwarding device to the corresponding forwarding device. A final delivery result is shown in FIG. 5E, that is, the first service controller 57 sends "--/100" to the forwarding device 53, sends "100/1025" to the first service controller 57, sends "1025/1026" to the node 59, sends "1026/1027" to the node 60, sends "1027/1028" to the node 61, sends "1028/3" to the second service controller 58, and sends "3/--" to the forwarding device 56. In the same way, the second service controller 48 splits the complete forwarding data of the second LSP, which is calculated in step 4, according to the forwarding devices and sends forwarding data that belongs to each forwarding device to the corresponding forwarding device. A final delivery result is shown in FIG. 5E, that is, the second service controller 58 sends "--/1000" to the forwarding device 53, sends "1000/2000" to the forwarding device 54, sends "2000/3" to the forwarding device 55, and sends "3/--" to the forwarding device 56.

For the forwarding devices, they only need to directly forward, after receiving the forwarding data sent by the service controllers, data on a forwarding plane according to the forwarding data. It can be seen that the forwarding devices do not need to run a control plane any longer and only need to run the forwarding plane, and unlike the conventional solution, there is no need to send soft state packets such as Hello, Path, and Resv, thereby alleviating burden and supporting more RSVP-TE LSPs.

Optionally, as a primary service controller (Primary Controller), the first service controller 57 controls establishment of the first LSP and the second LSP in the virtual cluster system. After the first service controller 57 is faulty, the forwarding plane is not affected and traffic is switched to the second LSP. If a fault of the first service controller 57 cannot be rectified, the forwarding devices 53 to 56 can age and delete, on their own, forwarding data that belongs to the first service controller 57 on the first LSP. In addition, after the first service controller 57 is faulty, the forwarding device 53 can perform control to upgrade the second service controller 58 that is used as a standby service controller (Standby Controller) to a new primary service controller.

In this embodiment, on a basis that a control plane is separated from a forwarding plane, a service controller is used to generate forwarding data in a centralized manner and a forwarding device does not need to run the control plane so that the forwarding device is freed and dedicated to data forwarding. The following beneficial effects are achieved compared with the conventional solution: 1. The service controller calculates complete forwarding data of an LSP in a centralized manner, and only corresponding forwarding data and some other necessary link information are transmitted between the service controller and the forwarding device, which saves system resources occupied by running a dynamic signaling protocol. The saved resources may be used to support more LSP forwarding, thereby improving an MPLS forwarding capability that the forwarding device is capable of supporting and increasing the number of MPLS LSPs that the forwarding device is capable of supporting. 2. The service controller performs centralized control to generate the complete forwarding data of the LSP, which further improves manageability of a user for the MPLS LSPs, can better make a policy with respect to LSPs, and further decreases network operation and maintenance costs.

Figure 6:
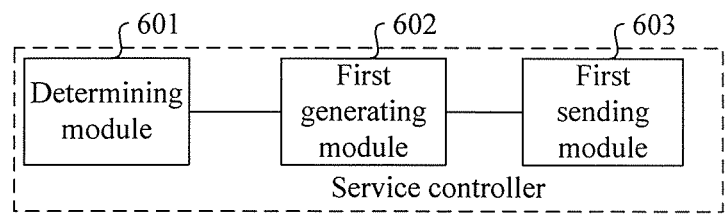
FIG. 6 is a schematic structural diagram of a service controller according to an embodiment of the present invention.
Figure 5F:
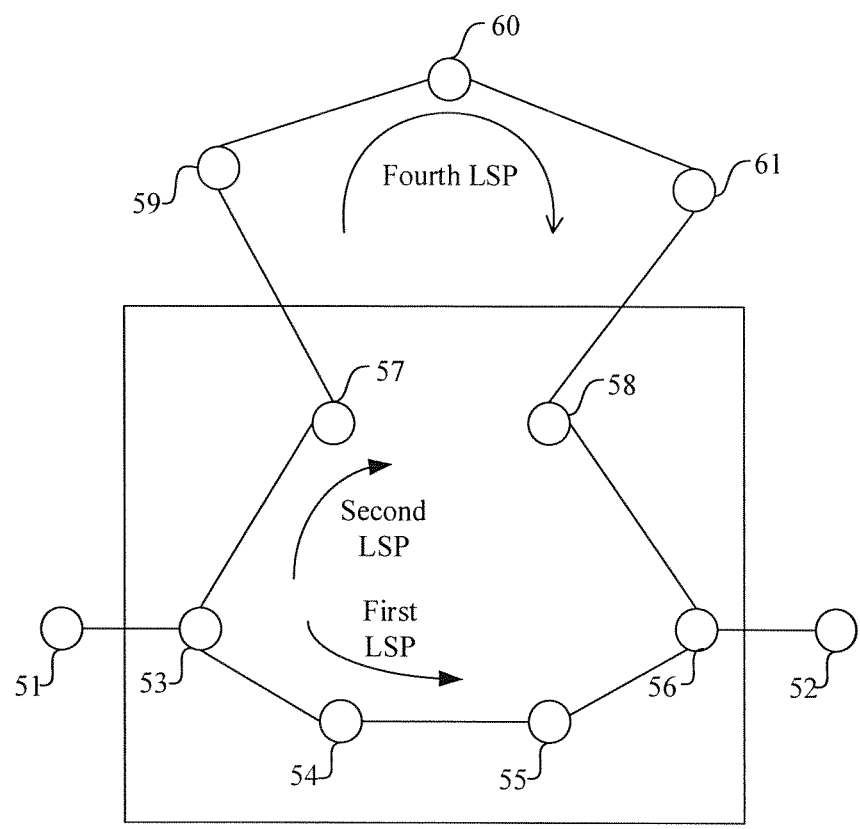

FIG. 6 is a schematic structural diagram of a service controller provided by an embodiment of the present invention. The service controller provided by this embodiment may be used as the first service controller in the foregoing manner embodiments. As shown in FIG. 6, the service controller provided by this embodiment includes: a determining module 601, a first generating module 602, and a first sending module 603.

The determining module 601 is configured to determine each hop on an LSP from a preset ingress to a preset egress. The first generating module 602 is connected to the determining module 601 and configured to: allocate, from first label space information of each hop determined by the determining module 601, a label to each hop, determine incoming and outgoing information of each hop according to topology information of each hop, and generate forwarding data of each hop. The first sending module 603 is connected to the first generating module 602 and configured to send the forwarding data of each hop, which is generated by the first generating module 602, to a node device corresponding to each hop to complete establishment of the LSP.

The foregoing functional modules may be configured to execute corresponding processes in the foregoing method embodiments. Specific working principles of the functional modules are not described herein again and reference may be made to descriptions of the method embodiments for details.

The service controller provided by this embodiment determines each hop on an LSP from a preset ingress to a preset egress, allocates a label to each hop, determines incoming and outgoing interface information of each hop, generates forwarding data of each hop, and then sends the forwarding data of each hop to a node device corresponding to each hop, so that a node device of each hop on the LSP can forward data according to the forwarding data sent by the service controller and there is no need to periodically send soft state packets such as Hello, Path, and Resv between node devices of the hops on the LSP, which alleviates load of the node devices and helps increase the number of RSVP-TE LSPs that each node device is capable of supporting. Further, because the service controller provided by this embodiment determines each hop on an LSP and calculates forwarding data of each hop in a centralized manner, a user does not need to configure RSVP-TE configurations explicitly on each node device, which simplifies complexity of user configuration and maintainability and alleviates the user's configuration burden.

Figure 7:
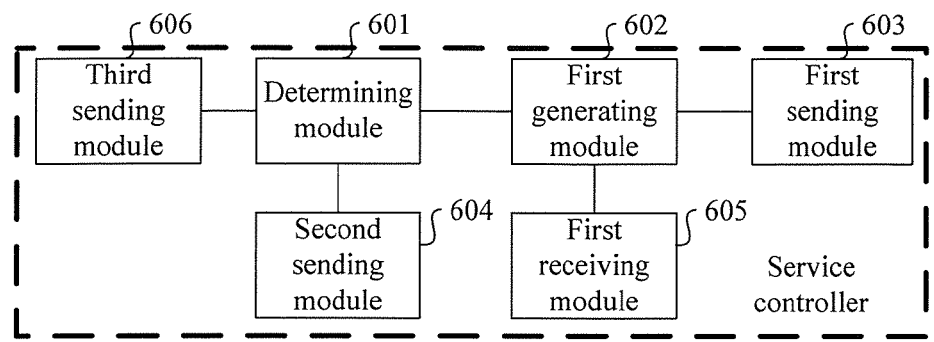
FIG. 7 is a schematic structural diagram of a service controller according to another embodiment of the present invention.

FIG. 7 is a schematic structural diagram of a service controller provided by another embodiment of the present invention. This embodiment is implemented based on the embodiment shown in FIG. 6. As shown in FIG. 7, the service controller provided by this embodiment also includes: a determining module 601, a first generating module 602, and a first sending module 603.

In this embodiment, the determining module 601 can be specifically configured to determine each hop on a first LSP and a second LSP that have a primary/standby protection relationship and are from a preset ingress to a preset egress.

In an optional implementation manner of this embodiment, the first generating module 602 can be specifically configured to: allocate, from first label space information of each hop that is determined by the determining module 601 on the first LSP, a label to each hop on the first LSP, determine incoming and outgoing interface information of each hop on the first LSP according to topology information of each hop on the first LSP, and generate forwarding data of each hop on the first LSP. Accordingly, the first sending module 603 can be specifically configured to send the forwarding data of each hop on the first LSP, which is generated by the first generating module 602, to a node device corresponding to each hop on the first LSP to complete establishment of the first LSP.

As shown in FIG. 7, the service controller provided by this embodiment further includes a second sending module 604. The second sending module 604 is connected to the determining module 601 and configured to send identifier information of each hop that is determined by the determining module 601 on the second LSP to a second service controller, so that the second service controller allocates, from second label space information of each hop on the second LSP, a label to each hop on the second LSP, determines incoming and outgoing interface information of each hop on the second LSP according to topology information of each hop on the second LSP, generates forwarding data of each hop on the second LSP, and then sends the forwarding data of each hop on the second LSP to a node device corresponding to each hop on the second LSP to complete establishment of the second LSP.

In an optional implementation manner of this embodiment, the service controller provided by this embodiment and the second service controller are connected through another network except a first network to which the service controller provided by this embodiment and the second service controller belong. Based on this, a process in which the determining module 601 determines each hop on the first LSP is specifically as follows: The determining module 601 is more specifically configured to determine each hop that is located in the first network on the first LSP from the preset ingress to the preset egress, where the first LSP passes through the other network. Accordingly, the first generating module 602 is more specifically configured to trigger establishment of a third LSP, allocates, from first label space information of each hop that is located in the first network on the first LSP, a label to each hop that is located in the first network on the first LSP, determines, incoming and outgoing interface information of each hop that is located in the first network on the first LSP according to topology information of each hop that is located in the first network on the first LSP, stitches the first LSP and the third LSP, and generates forwarding data of each hop that is located in the first network and each hop that is located in the other network on the first LSP. The third LSP is an LSP that uses the service controller provided by this embodiment as an ingress, uses the second service controller as an egress, and passes through the other network, where each hop on the third LSP except the ingress and the egress constitutes each hop that is located in the other network on the first LSP.

The first generating module 602 is more specifically configured to allocate an incoming label to the service controller provided by this embodiment on the third LSP, where the incoming label is an outgoing label of a previous hop of the service controller provided by this embodiment on the first LSP, and allocate an outgoing label to the second service controller on the third LSP, where the outgoing label is an incoming label of a next hop of the second service controller on the first LSP. Each hop on the third LSP except the service controller provided by this embodiment and the second service controller constitutes each hop that is located in the other network on the first LSP.

In an optional implementation manner of this embodiment, the service controller provided by this embodiment and the second service controller are connected through another network except a first network to which the service controller provided by this embodiment and the second service controller belong. Based on this, a process in which the determining module 601 determines each hop on the second LSP is specifically as follows: The determining module 601 is more specifically configured to determine each hop that is located in the first network on the second LSP from the preset ingress to the preset egress, where the second LSP passes through the other network. Accordingly, the second sending module 604 can be specifically configured to trigger establishment of a fourth LSP and send a stitching and binding relationship between the second LSP and the fourth LSP, identifier information of each hop that is located in the first network on the second LSP, and identifier information of an ingress of the fourth LSP to the second service controller. The stitching and binding relationship between the second LSP and the fourth LSP is indication information used to instruct the second service controller to stitch the second LSP and the fourth LSP. The fourth LSP is an LSP that uses the service controller provided by this embodiment as the ingress, uses the second service controller as an egress, and passes through the other network, where each hop on the fourth LSP except the ingress and the egress constitutes each hop that is located in the other network on the second LSP.

In an optional implementation manner of this embodiment, the first generating module 602 can be specifically configured to allocate, from first label space information of each hop that is determined by the determining module 601 on the first LSP, a label to each hop on the first LSP, determine incoming and outgoing interface information of each hop on the first LSP according to topology information of each hop on the first LSP, and generate forwarding data of each hop on the first LSP; and allocate, from first label space information of each hop that is determined by the determining module 601 on the second LSP, a label to each hop on the second LSP, determine incoming and outgoing interface information of each hop on the second LSP according to topology information of each hop on the second LSP, and generate forwarding data of each hop on the second LSP. Accordingly, the first sending module 603 can be specifically configured to send the forwarding data of each hop on the first LSP, which is generated by the first generating module 602, to a node device corresponding to each hop on the first LSP to complete establishment of the first LSP, and send the forwarding data of each hop on the second LSP, which is generated by the first generating module 602, to a node device corresponding to each hop on the second LSP to complete establishment of the second LSP.

As shown in FIG. 7, the service controller provided by this embodiment further includes a first receiving module 605. The first receiving module 605 is configured to receive registration information sent by each forwarding device in a network to which the service controller provided by this embodiment belongs, where the registration information includes topology information of the forwarding device and first label space information of the forwarding device. The first receiving module 605 is connected to the first generating module 602 and configured to provide the topology information of the forwarding device and the first label space information of the forwarding device for the first generating module 602.

As shown in FIG. 7, the service controller provided by this embodiment further includes a third sending module 606. The third sending module 606 is connected to the determining module 601 and configured to send identifier information of each hop that is determined by the determining module 601 on the first LSP to the second service controller for backup.

The foregoing functional modules may be configured to execute corresponding processes in the foregoing method embodiments. Specific working principles of the functional modules are not described herein again and reference may be made to descriptions of the method embodiments for details.

The service controller provided by this embodiment determines each hop on an LSP from a preset ingress to a preset egress, allocates a label to each hop, determines incoming and outgoing interface information of each hop, generates forwarding data of each hop, and then sends the forwarding data of each hop to a node device corresponding to each hop, so that a node device of each hop on the LSP can forward data according to the forwarding data sent by the service controller and there is no need to periodically send soft state packets such as Hello, Path, and Resv between node devices of the hops on the LSP, which alleviates load of the node devices and helps increase the number of RSVP-TE LSPs that each node device is capable of supporting. Further, because the service controller provided by this embodiment determines each hop on an LSP and calculates forwarding data of each hop in a centralized manner, a user does not need to configure RSVP-TE configurations explicitly on each node device, which simplifies complexity of user configuration and maintainability and alleviates the user's configuration burden.

Figure 8:
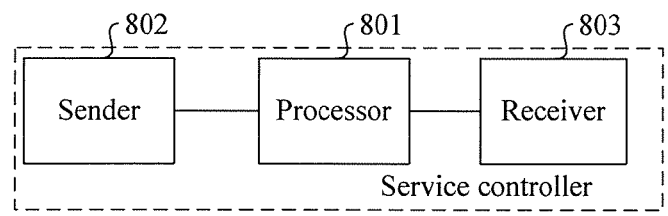
FIG. 8 is a schematic structural diagram of a service controller according to still another embodiment of the present invention.

FIG. 8 is a schematic structural diagram of a service controller provided by still another embodiment of the present invention. As shown in FIG. 8, the service controller provided by this embodiment includes a processor 801 and a sender 802.

The processor 801 is configured to determine each hop on an LSP from a preset ingress to a preset egress, allocate, from first label space information of each hop, a label to each hop, determine incoming and outgoing interface information of each hop according to topology information of each hop, and generate forwarding data of each hop. The sender 802 is connected to the processor 801 and configured to send the forwarding data of each hop, which is generated by the processor 801, to a node device corresponding to each hop to complete establishment of the LSP.

In an optional implementation manner of this embodiment, the processor 801 is specifically configured to determine each hop on a first LSP and a second LSP that have a primary/standby protection relationship and are from the preset ingress to the preset egress.

In an optional implementation manner of this embodiment, the processor 801 is specifically configured to allocate, from first label space information of each hop that is determined on the first LSP, a label to each hop on the first LSP, determine incoming and outgoing interface information of each hop on the first LSP according to topology information of each hop on the first LSP, and generate forwarding data of each hop on the first LSP. Accordingly, the sender 802 can be specifically configured to send the forwarding data of each hop on the first LSP to a node device corresponding to each hop on the first LSP to complete establishment of the first LSP.

In an optional implementation manner of this embodiment, the sender 802 can be further configured to send identifier information of each hop that is determined by the processor 801 on the second LSP to a second service controller, so that the second service controller allocates, from second label space information of each hop on the second LSP, a label to each hop on the second LSP, determines incoming and outgoing interface information of each hop on the second LSP according to topology information of each hop on the second LSP, generates forwarding data of each hop on the second LSP, and then sends the forwarding data of each hop on the second LSP to a node device corresponding to each hop on the second LSP to complete establishment of the second LSP.

In an optional implementation manner of this embodiment, the service controller provided by this embodiment and the second service controller are connected through another network except a first network to which the service controller provided by this embodiment and the second service controller belong. Based on this, the processor 801 is specifically configured to determine each hop that is located in the first network on the first LSP from the preset ingress to the preset egress, where the first LSP passes through the other network. The processor 801 is specifically configured to trigger establishment of a third LSP, allocate, from first label space information of each hop that is located in the first network on the first LSP, a label to each hop that is located in the first network on the first LSP, determine incoming and outgoing interface information of each hop that is located in the first network on the first LSP according to topology information of each hop that is located in the first network on the first LSP, stitch the first LSP and the third LSP, and generate forwarding data of each hop that is located in the first network and each hop that is located in the other network on the first LSP, where the third LSP is an LSP that uses the service controller provided by this embodiment as an ingress, uses the second service controller as an egress, and passes through the other network. Each hop on the third LSP except the ingress and the egress constitutes each hop that is located in the other network on the first LSP.

In an optional implementation manner of this embodiment, the service controller provided by this embodiment and the second service controller are connected through another network except a first network to which the service controller provided by this embodiment and the second service controller belong. Based on this, the processor 801 is specifically configured to determine each hop that is located in the first network on the second LSP from the preset ingress to the preset egress, where the second LSP passes through the other network. The sender 802 is specifically configured to trigger establishment of a fourth LSP and send a stitching and binding relationship between the second LSP and the fourth LSP, identifier information of each hop that is located in the first network on the second LSP, and identifier information of an ingress of the fourth LSP to the second service controller, where the fourth LSP is an LSP that uses the service controller provided by this embodiment as the ingress, the second service controller as an egress, and passes through the other network. Each hop on the fourth LSP except the ingress and the egress constitutes each hop that is located in the other network on the second LSP. The stitching and binding relationship between the second LSP and the fourth LSP is indication information used to instruct the second service controller to stitch the second LSP and the fourth LSP.

In an optional implementation manner of this embodiment, the processor 801 can be specifically configured to allocate, from first label space information of each hop on the first LSP, a label to each hop on the first LSP, determine incoming and outgoing interface information of each hop on the first LSP according to topology information of each hop on the first LSP, and generate forwarding data of each hop on the first LSP; and allocate, from first label space information of each hop on the second LSP, a label to each hop on the second LSP, determine incoming and outgoing interface information of each hop on the second LSP according to topology information of each hop on the second LSP, and generate forwarding data of each hop on the second LSP. Accordingly, the sender 802 can be specifically configured to send the forwarding data of each hop on the first LSP, which is generated by the processor 801, to a node device corresponding to each hop on the first LSP to complete establishment of the first LSP, and send the forwarding data of each hop on the second LSP, which is generated by the processor 801, to a node device corresponding to each hop on the second LSP to complete establishment of the second LSP.

As shown in FIG. 8, the service controller provided by this embodiment further includes a receiver 803. The receiver 803 is configured to receive registration information sent by each forwarding device in a network to which the service controller provided by this embodiment belongs, where the registration information includes topology information of the forwarding device and first label space information of the forwarding device. Optionally, the receiver 803 is connected to the processor 801 and configured to provide the topology information of the forwarding device and the first label space information of the forwarding device for the processor 801.

In an optional implementation manner of this embodiment, the sender 802 is further configured to send identifier information of each hop that is determined by the processor 801 on the first LSP to the second service controller for backup.

The service controller provided by this embodiment may be configured to execute corresponding processes in the foregoing method embodiments. Specific working principles of the service controller are not described herein again and reference may be made to descriptions of the method embodiments for details.

The service controller provided by this embodiment determines each hop on an LSP from a preset ingress to a preset egress, allocates a label to each hop, determines incoming and outgoing interface information of each hop, generates forwarding data of each hop, and then sends the forwarding data of each hop to a node device corresponding to each hop, so that a node device of each hop on the LSP can forward data according to the forwarding data sent by the service controller and there is no need to periodically send soft state packets such as Hello, Path, and Resv between node devices of the hops on the LSP, which alleviates load of the node devices and helps increase the number of RSVP-TE LSPs that each node device is capable of supporting. Further, because the service controller provided by this embodiment determines each hop on an LSP and calculates forwarding data of each hop in a centralized manner, a user does not need to configure RSVP-TE configurations explicitly on each node device, which simplifies complexity of user configuration and maintainability and alleviates the user's configuration burden.

Figure 9:
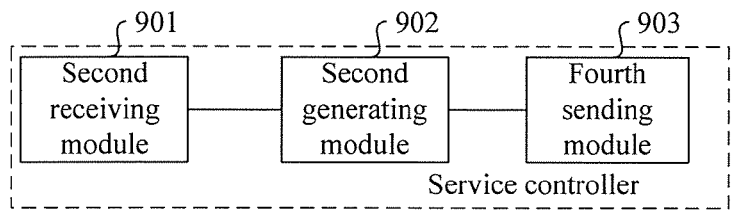
FIG. 9 is a schematic structural diagram of a service controller according to still another embodiment of the present invention.

FIG. 9 is a schematic structural diagram of a service controller provided by still another embodiment of the present invention. As shown in FIG. 9, the service controller provided by this embodiment includes: a second receiving module 901, a second generating module 902, and a fourth sending module 903.

The second receiving module 901 is configured to receive identifier information, which is sent by a first service controller, of each hop on a second LSP, where the second LSP is an LSP, which is determined by the first service controller, from a preset ingress to a preset egress. The second generating module 902 is connected to the second receiving module 901 and configured to: identify each hop on the second LSP, according to the identifier information of each hop on the second LSP, which is received by the second receiving module 901, allocate, from second label space information of each hop on the second LSP, a label to each hop on the second LSP, determine incoming and outgoing interface information of each hop on the second LSP according to topology information of each hop on the second LSP, and generate forwarding data of each hop on the second LSP. The fourth sending module 903 is connected to the second generating module 902 and configured to send the forwarding data of each hop on the second LSP, which is generated by the second generating module 902, to a node device corresponding to each hop on the second LSP to complete establishment of the second LSP.

In an optional implementation manner of this embodiment, the first service controller and the service controller provided by this embodiment are connected through another network except a first network to which the first service controller and the service controller provided by this embodiment belong. Based on this, the second receiving module 901 can be specifically configured to receive, from the first service controller, a stitching and binding relationship between the second LSP and a fourth LSP, identifier information of each hop that is located in the first network on the second LSP, and identifier information of an ingress of the fourth LSP, where the fourth LSP is an LSP that is established upon triggering by the first service controller, uses the first service controller as the ingress, uses the service controller provided by this embodiment as an egress, and passes through the other network. Each hop on the fourth LSP except the ingress and the egress constitutes each hop that is located in the other network on the second LSP. The stitching and binding relationship between the second LSP and the fourth LSP is indication information used to instruct a second service controller to stitch the second LSP and the fourth LSP.

Based on the foregoing description, the second generating module 902 can be specifically configured to allocate, from second label space information of each hop that is located in the first network on the second LSP, a label to each hop that is located in the first network on the second LSP, determine incoming and outgoing interface information of each hop that is located in the first network on the second LSP according to topology information of each hop that is located in the first network on the second LSP, stitch the second LSP and the fourth LSP, and generate forwarding data of each hop that is located in the first network and each hop that is located in the other network on the second LSP. The second generating module 902 is more specifically configured to allocate an incoming label to the first service controller on the fourth LSP, where the incoming label is an outgoing label of a previous hop of the first service controller on the second LSP, and allocate an outgoing label to the service controller provided by this embodiment on the fourth LSP, where the outgoing label is an incoming label of a next hop of the service controller provided by this embodiment on the second LSP. Each hop on the fourth LSP except the first service controller and the service controller provided by this embodiment constitutes each hop that is located in the other network on the second LSP.

Figure 10:
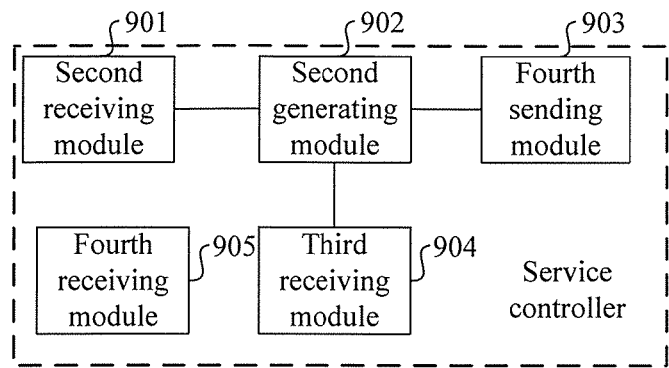
FIG. 10 is a schematic structural diagram of a service controller according to still another embodiment of the present invention.

In an optional implementation manner of this embodiment, as shown in FIG. 10, the service controller provided by this embodiment further includes a third receiving module 904. The third receiving module 904 is configured to receive registration information sent by each forwarding device in a network to which the service controller provided by this embodiment belongs, where the registration information includes topology information of the forwarding device and second label space information of the forwarding device. The third receiving module 904 is connected to the second generating module 902 and configured to provide the topology information of the forwarding device and the second label space information of the forwarding device for the second generating module 902.

In an optional implementation manner of this embodiment, as shown in FIG. 10, the service controller provided by this embodiment further includes a fourth receiving module 905. The fourth receiving module 905 is configured to receive identifier information, which is sent by the first service controller, of each hop on a first LSP, where the first LSP is another LSP, which is determined by the first service controller, from the preset ingress to the preset egress, and the first LSP and the second LSP have a primary/standby protection relationship.

The foregoing functional modules may be configured to execute corresponding processes in the foregoing method embodiments. Specific working principles of the functional modules are not described herein again and reference may be made to descriptions of the method embodiments for details.

The service controller provided by this embodiment is used as a second service controller and cooperates with a first service controller. The first service controller determines each hop on an LSP from a preset ingress to a preset egress. The service controller provided by this embodiment receives identifier information of each hop on the LSP, which is provided by the first service controller, allocates a label to each hop, determines incoming and outgoing interface information of each hop, generates forwarding data of each hop, and then sends the forwarding data of each hop to a node device corresponding to each hop, so that a node device of each hop on the LSP can forward data according to the forwarding data sent by the service controller provided by this embodiment and there is no need to periodically send soft state packets such as Hello, Path, and Resv between node devices of the hops on the LSP, which alleviates load of the node devices and helps increase the number of RSVP-TE LSPs that each node device is capable of supporting. Further, because the service controller provided by this embodiment determines each hop on an LSP and calculates forwarding data of each hop in a centralized manner, a user does not need to configure RSVP-TE configurations explicitly on each node device, which simplifies complexity of user configuration and maintainability and alleviates the user's configuration burden.

Figure 11:
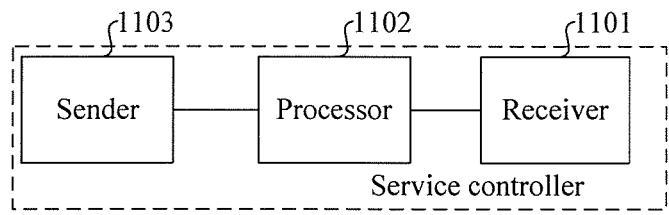
FIG. 11 is a schematic structural diagram of a service controller according to still another embodiment of the present invention.

FIG. 11 is a schematic structural diagram of a service controller provided by still another embodiment of the present invention. As shown in FIG. 11, the service controller provided by this embodiment includes a receiver 1101, a processor 1102, and a sender 1103.

The receiver 1101 is configured to receive identifier information, which is sent by a first service controller, of each hop on a second LSP, where the second LSP is an LSP, which is determined by the first service controller, from a preset ingress to a preset egress. The processor 1102 is connected to the receiver 1101 and configured to allocate, from second label space information of each hop on the second LSP, a label to each hop on the second LSP, determine incoming and outgoing interface information of each hop on the second LSP according to topology information of each hop on the second LSP, and generate forwarding data of each hop on the second LSP. The sender 1103 is connected to the processor 1102 and configured to send the forwarding data of each hop on the second LSP, which is generated by the processor 1102, to a node device corresponding to each hop on the second LSP to complete establishment of the second LSP.

In an optional implementation manner of this embodiment, the first service controller and the service controller provided by this embodiment are connected through another network except a first network to which the first service controller and the service controller provided by this embodiment belong. Based on this, the receiver 1101 can be specifically configured to receive, from the first service controller, a stitching and binding relationship between the second LSP and a fourth LSP, identifier information of each hop that is located in the first network on the second LSP, and identifier information of an ingress of the fourth LSP, where the fourth LSP is an LSP that is established upon triggering by the first service controller, uses the first service controller as the ingress, uses the service controller provided by this embodiment as an egress, and passes through the other network. Each hop on the fourth LSP except the ingress and the egress constitutes each hop that is located in the other network on the second LSP. The stitching and binding relationship between the second LSP and the fourth LSP is indication information used to instruct a second service controller to stitch the second LSP and the fourth LSP.

Based on the foregoing description, the processor 1102 can be specifically configured to allocate, from second label space information of each hop that is located in the first network on the second LSP, a label to each hop that is located in the first network on the second LSP, determine incoming and outgoing interface information of each hop that is located in the first network on the second LSP according to topology information of each hop that is located in the first network on the second LSP, stitch the second LSP and the fourth LSP, and generate forwarding data of each hop that is located in the first network and each hop that is located in the other network on the second LSP.

In an optional implementation manner of this embodiment, the receiver 1101 is further configured to receive registration information sent by each forwarding device in a network to which the service controller provided by this embodiment belongs, where the registration information includes topology information of the forwarding device and second label space information of the forwarding device. The receiver 1101 provides the topology information of the forwarding device and the second label space information of the forwarding device for the processor 1102.

In an optional implementation manner of this embodiment, the receiver 1101 is further configured to receive identifier information, which is sent by the first service controller, of each hop on a first LSP, where the first LSP is another LSP, which is determined by the first service controller, from the preset ingress to the preset egress, and the first LSP and the second LSP have a primary/standby protection relationship.

The service controller provided by this embodiment may be configured to execute corresponding processes in the foregoing method embodiments. Specific working principles of the service controller are not described herein again and reference may be made to descriptions of the method embodiments for details.

The service controller provided by this embodiment is used as a second service controller and cooperates with a first service controller. The first service controller determines each hop on an LSP from a preset ingress to a preset egress. The service controller provided by this embodiment receives identifier information of each hop on the LSP, which is provided by the first service controller, allocates a label to each hop, determines incoming and outgoing interface information of each hop, generates forwarding data of each hop, and then sends the forwarding data of each hop to a node device corresponding to each hop, so that a node device of each hop on the LSP can forward data according to the forwarding data sent by the service controller provided by this embodiment and there is no need to periodically send soft state packets such as Hello, Path, and Resv between node devices of the hops on the LSP, which alleviates load of the node devices and helps increase the number of RSVP-TE LSPs that each node device is capable of supporting. Further, because the service controller provided by this embodiment determines each hop on an LSP and calculates forwarding data of each hop in a centralized manner, a user does not need to configure RSVP-TE configurations explicitly on each node device, which simplifies complexity of user configuration and maintainability and alleviates the user's configuration burden.

Figure 12:
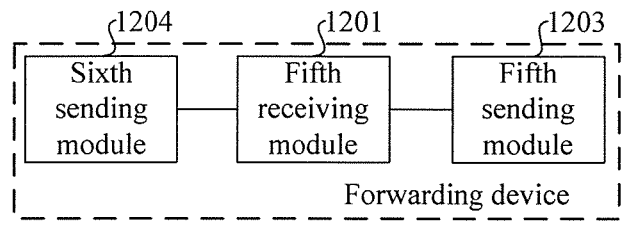
FIG. 12 is a schematic structural diagram of a forwarding device according to an embodiment of the present invention.

FIG. 12 is a schematic structural diagram of a forwarding device provided by an embodiment of the present invention. As shown in FIG. 12, the forwarding device provided by this embodiment includes: a fifth receiving module 1201 and a fifth sending module 1203.

The fifth receiving module 1201 is configured to receive forwarding data, which is sent by a service controller, of the forwarding device on a label switching path (LSP) from a preset ingress to a preset egress, where the forwarding data of the forwarding device includes a label that the service controller allocates to the forwarding device provided by the embodiment from label space information of the forwarding device provided by this embodiment, and incoming and outgoing interface information that the service controller determines for the forwarding device provided by this embodiment according to topology information of the forwarding device provided by this embodiment. The fifth sending module 1203 is connected to the fifth receiving module 1201 and configured to forward data according to the forwarding data of the forwarding device, which is received by the fifth receiving module 1201.

In an optional implementation manner of this embodiment, the service controller includes a first service controller and/or a second service controller; the LSP includes a first LSP and/or a second LSP of two LSPs that have a primary/standby protection relationship, where each hop on the first LSP is determined by the first service controller and each hop on the second LSP is determined by the first service controller and provided for the second service controller; and the label space information of the forwarding device includes first label space information and/or a second label space. Based on this, the fifth receiving module 1201 is specifically configured to receive forwarding data, which is sent by the first service controller, of the forwarding device provided by this embodiment on the first LSP from the preset ingress to the preset egress; and/or the fifth receiving module 1201 is specifically configured to receive forwarding data, which is sent by the second service controller, of the forwarding device provided by this embodiment on the second LSP from the preset ingress to the preset egress.

In an optional implementation manner of this embodiment, as shown in FIG. 12, the forwarding device provided by this embodiment further includes a sixth sending module 1204. The sixth sending module 1204 is configured to send first registration information to the first service controller and send second registration information to the second service controller, where the first registration information includes the topology information of the forwarding device provided by this embodiment and the first label space information of the forwarding device provided by this embodiment, and the second registration information includes the topology information of the forwarding device provided by this embodiment and the second label space information of the forwarding device provided by this embodiment. Optionally, the sixth sending module 1204 is connected to the fifth receiving module 1201 and configured to send, before the fifth receiving module 1201 receives the forwarding data sent by the service controller, registration information to the service controller.

In an optional implementation manner of this embodiment, the forwarding device provided by this embodiment is the preset ingress. In this case, the fifth sending module 1203 can be specifically configured to forward the data according to the forwarding data of the forwarding device provided by this embodiment on the first LSP and the forwarding data of the forwarding device provided by this embodiment on the second LSP.

Further, the fifth sending module 1203 is more specifically configured to forward the data according to the forwarding data of the forwarding device provided by this embodiment on the first LSP if it is discovered that the first service controller is normal, and forward the data according to the forwarding data of the forwarding device provided by this embodiment on the second LSP if it is discovered that the first service controller is faulty.

The foregoing functional modules may be configured to execute corresponding processes in the foregoing method embodiments. Specific working principles of the functional modules are not described herein again and reference may be made to descriptions of the method embodiments for details.

The forwarding device provided by this embodiment is used as a hop on an LSP from a preset ingress to a preset egress to receive forwarding data, which is sent by a service controller, of the forwarding device on the LSP from the preset ingress to the preset egress and forward data according to the forwarding data, so that there is no need to periodically send soft state packets, such as Hello, Path, and Resv, between the forwarding device and nodes on the LSP, which alleviates load of the forwarding device and helps increase the number of RSVP-TE LSPs that the forwarding device is capable of supporting.

Figure 13:
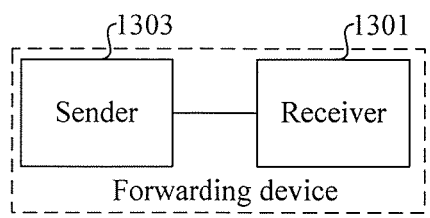
FIG. 13 is a schematic structural diagram of a forwarding device according to another embodiment of the present invention.

FIG. 13 is a schematic structural diagram of a forwarding device provided by another embodiment of the present invention. As shown in FIG. 13, the forwarding device provided by this embodiment includes: a receiver 1301 and a sender 1303.

The receiver 1301 is configured to receive forwarding data, which is sent by a service controller, of the forwarding device on a label switching path (LSP) from a preset ingress to a preset egress, where the forwarding data of the forwarding device includes a label that the service controller allocates to the forwarding device provided by the embodiment from label space information of the forwarding device provided by this embodiment, and incoming and outgoing interface information that the service controller determines for the forwarding device provided by this embodiment according to topology information of the forwarding device provided by this embodiment. The sender 1303 is connected to the receiver 1301 and configured to forward data according to the forwarding data of the forwarding device, which is received by the receiver 1301.

In an optional implementation manner of this embodiment, the service controller includes a first service controller and/or a second service controller; the LSP includes a first LSP and/or a second LSP of two LSPs that have a primary/standby protection relationship, where each hop on the first LSP is determined by the first service controller and each hop on the second LSP is determined by the first service controller and provided for the second service controller; and the label space information of the forwarding device includes first label space information and/or a second label space. Based on this, the receiver 1301 is specifically configured to receive forwarding data, which is sent by the first service controller, of the forwarding device provided by this embodiment on the first LSP from the preset ingress to the preset egress; and/or the receiver 1301 is specifically configured to receive forwarding data, which is sent by the second service controller, of the forwarding device provided by this embodiment on the second LSP from the preset ingress to the preset egress.

In an optional implementation manner of this embodiment, the sender 1303 is further configured to send first registration information to the first service controller and send second registration information to the second service controller, where the first registration information includes the topology information of the forwarding device provided by this embodiment and the first label space information of the forwarding device provided by this embodiment, and the second registration information includes the topology information of the forwarding device provided by this embodiment and the second label space information of the forwarding device provided by this embodiment.

In an optional implementation manner of this embodiment, the forwarding device provided by this embodiment is the preset ingress. In this case, the sender 1303 can be specifically configured to forward data according to the forwarding data of the forwarding device provided by this embodiment on the first LSP and the forwarding data of the forwarding device provided by this embodiment on the second LSP.

Further, the sender 1303 is more specifically configured to forward the data according to the forwarding data of the forwarding device provided by this embodiment on the first LSP if it is discovered that the first service controller is normal, and forward the data according to the forwarding data of the forwarding device provided by this embodiment on the second LSP if it is discovered that the first service controller is faulty.

The forwarding device provided by this embodiment may be configured to execute corresponding processes in the foregoing method embodiments. Specific working principles of the forwarding device are not described herein again and reference may be made to descriptions of the method embodiments for details.

The forwarding device provided by this embodiment is used as a hop on an LSP from a preset ingress to a preset egress to receive forwarding data, which is sent by a service controller, of the forwarding device on the LSP from the preset ingress to the preset egress and forward data according to the forwarding data, so that there is no need to periodically send soft state packets, such as Hello, Path, and Resv, between the forwarding device and nodes on the LSP, which alleviates load of the forwarding device and helps increase the number of RSVP-TE LSPs that the forwarding device is capable of supporting.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A label switching path (LSP) establishment method, comprising:
    determining, by a first service controller, each hop on an LSP from a preset ingress to a preset egress;
    allocating, by the first service controller from first label space information of each hop, a label to each hop, determining incoming and outgoing interface information of each hop according to topology information of each hop, generating forwarding data of each hop, and sending the forwarding data of each hop to each node device corresponding to each hop to complete establishment of the LSP;
    wherein determining, by a first service controller, each hop on an LSP from a preset ingress to a preset egress comprises:
        determining, by the first service controller, each hop on a first LSP and a second LSP that have a primary/standby protection relationship and are from the preset ingress to the preset egress;
    wherein allocating, by the first service controller from first label space information of each hop, a label to each hop, determining incoming and outgoing interface information of each hop according to topology information of each hop, generating forwarding data of each hop, and sending the forwarding data of each hop to each node device corresponding to each hop to complete establishment of the LSP comprises:
        allocating, by the first service controller from first label space information of each hop on the first LSP, a label to each hop on the first LSP, determining incoming and outgoing interface information of each hop on the first LSP according to topology information of each hop on the first LSP, generating forwarding data of each hop on the first LSP, and then sending the forwarding data of each hop on the first LSP to each node device corresponding to each hop on the first LSP to complete establishment of the first LSP; and
        sending, by the first service controller, identifier information of each hop on the second LSP to a second service controller, so that the second service controller allocates, from second label space information of each hop on the second LSP, a label to each hop on the second LSP, determines incoming and outgoing interface information of each hop on the second LSP according to topology information of each hop on the second LSP, generates forwarding data of each hop on the second LSP, and then sends the forwarding data of each hop on the second LSP to each node device corresponding to each hop on the second LSP to complete establishment of the second LSP;
    wherein:
        the first service controller and the second service controller are connected through another network except a first network to which the first service controller and the second service controller belong;
        determining, by the first service controller, each hop on a first LSP from the preset ingress to the preset egress comprises:
            determining, by the first service controller, each hop that is located in the first network on the first LSP from the preset ingress to the preset egress, wherein the first LSP passes through the other network; and
        allocating, by the first service controller from first label space information of each hop on the first LSP, a label to each hop on the first LSP, determining incoming and outgoing interface information of each hop on the first LSP according to topology information of each hop on the first LSP; and generating forwarding data of each hop on the first LSP comprises:
            triggering, by the first service controller, establishment of a third LSP, wherein the third LSP is an LSP that uses the first service controller as an ingress, uses the second service controller as an egress, and passes through the other network, and
            allocating, by the first service controller from first label space information of each hop that is located in the first network on the first LSP, a label to each hop that is located in the first network on the first LSP, determining incoming and outgoing interface information of each hop that is located in the first network on the first LSP according to topology information of each hop that is located in the first network on the first LSP, stitching the first LSP and the third LSP, and generating forwarding data of each hop that is located in the first network and each hop that is located in the any other network on the first LSP.

2. The LSP establishment method according to claim 1, wherein stitching, by the first service controller, the first LSP and the third LSP comprises:
    allocating, by the first service controller, an incoming label to the first service controller on the third LSP, wherein the incoming label is an outgoing label of a previous hop of the first service controller on the first LSP;
    allocating, by the first service controller, an outgoing label to the second service controller on the third LSP, wherein the outgoing label is an incoming label of a next hop of the second service controller on the first LSP; and
    wherein each hop on the third LSP except the first service controller and the second service controller constitutes each hop that is located in the other network on the first LSP.

3. The LSP establishment method according to claim 1, wherein allocating, by the first service controller from first label space information of each hop, a label to each hop, determining incoming and outgoing interface information of each hop according to topology information of each hop, generating forwarding data of each hop, and sending the forwarding data of each hop to each node device corresponding to each hop to complete establishment of the LSP further comprises:

allocating, by the first service controller from first label space information of each hop on the second LSP, a label to each hop on the second LSP, determining incoming and outgoing interface information of each hop on the second LSP according to topology information of each hop on the second LSP, generating forwarding data of each hop on the second LSP, and then sending the forwarding data of each hop on the second LSP to each node device corresponding to each hop on the second LSP to complete establishment of the second LSP.

4. The LSP establishment method according to claim 1, wherein before determining, by a first service controller, each hop on an LSP from a preset ingress to a preset egress, the method comprises:

receiving, by the first service controller, registration information sent by each forwarding device in a network to which the first service controller belongs, wherein the registration information comprises topology information of each forwarding device and first label space information of each forwarding device.

5. The LSP establishment method according to claim 1, further comprising:

sending, by the first service controller, identifier information of each hop on the first LSP to the second service controller for backup.

6. The LSP establishment method according to claim 1, wherein:

the first LSP and the second LSP are both bidirectional LSPs; or
 the first LSP and the second LSP are both unidirectional LSPs.

7. The LSP establishment method according to claim 1, wherein:

the first LSP and the second LSP are both point-to-point P2P LSPs; or
 the first LSP and the second LSP are both point-to-multipoint P2MP LSPs.

8. A label switching path (LSP) establishment method, comprising:

receiving, by a second service controller, identifier information, which is sent by a first service controller, of each hop on a second LSP, wherein the second LSP is an LSP, which is determined by the first service controller, from a preset ingress to a preset egress;
 allocating, by the second service controller from second label space information of each hop on the second LSP, a label to each hop on the second LSP, determining incoming and outgoing interface information of each hop on the second LSP according to topology information of each hop on the second LSP, and generating forwarding data of each hop on the second LSP; and
 sending, by the second service controller, the forwarding data of each hop on the second LSP to each node device corresponding to each hop on the second LSP to complete establishment of the second LSP;
 the first service controller and the second service controller are connected through another network except a first network to which the first service controller and the second service controller belong; and
 receiving, by a second service controller, identifier information, which is sent by a first service controller, of each hop on a second LSP comprises:
 receiving, by the second service controller from the first service controller, a stitching and binding relationship between the second LSP and a fourth LSP, identifier information of each hop that is located in the first network on the second LSP, and identifier information of an ingress of the fourth LSP, wherein the fourth LSP is an LSP that is established upon triggering by the first service controller, uses the first service controller as the ingress, uses the second service controller as an egress, and passes through the other network.

9. The LSP establishment method according to claim 8, wherein allocating, by the second service controller from second label space information of each hop on the second LSP, a label to each hop on the second LSP, determining incoming and outgoing interface information of each hop on the second LSP according to topology information of each hop on the second LSP, and generating forwarding data of each hop on the second LSP comprises:

allocating, by the second service controller from second label space information of each hop that is located in the first network on the second LSP, a label to each hop that is located in the first network on the second LSP, determining incoming and outgoing interface information of each hop that is located in the first network on the second LSP according to topology information of each hop that is located in the first network on the second LSP, stitching the second LSP and the fourth LSP, and generating forwarding data of each hop that is located in the first network and each hop that is located in the other network on the second LSP.

10. The LSP establishment method according to claim 9, wherein stitching, by the second service controller, the second LSP and the fourth LSP comprises:

allocating, by the second service controller, an incoming label to the first service controller on the fourth LSP, wherein the incoming label is an outgoing label of a previous hop of the first service controller on the second LSP;
 allocating, by the second service controller, an outgoing label to the second service controller on the fourth LSP, wherein the outgoing label is an incoming label of a next hop of the second service controller on the second LSP; and
 wherein each hop on the fourth LSP except the first service controller and the second service controller constitutes each hop that is located in the other network on the second LSP.

11. The LSP establishment method according to claim 8, wherein before receiving, by a second service controller, identifier information, which is sent by a first service controller, of each hop on a second LSP, the method comprises:

receiving, by the second service controller, registration information sent by each forwarding device in a network to which the second service controller belongs, wherein the registration information comprises topology information of the each forwarding device and second label space information of the each forwarding device.

12. The LSP establishment method according to claim 8, further comprising:

receiving, by the second service controller, identifier information, which is sent by the first service controller, of each hop on a first LSP, wherein the first LSP is another LSP, which is determined by the first service controller, from the preset ingress to the preset egress, and the first LSP and the second LSP have a primary/standby protection relationship.

13. A service controller, comprising:
a processor, configured to:
   determine each hop on a first label switching path (LSP) and a second LSP that have a primary/standby protection relationship and are from the preset ingress to the preset egress, and
   allocate, from first label space information of each hop on the first LSP, a label to each hop on the first LSP, determine incoming and outgoing interface information of each hop on the first LSP according to topology information of each hop on the first LSP, and generate forwarding data of each hop on the first LSP;
a sender, configured to:
   send the forwarding data of each hop on the first LSP to each node device corresponding to each hop on the first LSP to complete establishment of the first LSP, and
   send identifier information of each hop on the second LSP to a second service controller, so that the second service controller allocates, from second label space information of each hop on the second LSP, a label to each hop on the second LSP, determines incoming and outgoing interface information of each hop on the second LSP according to topology information of each hop on the second LSP, generates forwarding data of each hop on the second LSP, and then sends the forwarding data of each hop on the second LSP to each node device corresponding to each hop on the second LSP to complete establishment of the second LSP;
the service controller and the second service controller are connected through another network except a first network to which the service controller and the second service controller belong;
the processor is further configured to:
   determine each hop that is located in the first network on the first LSP from the preset ingress to the preset egress, wherein the first LSP passes through the other network; trigger establishment of a third LSP,
   allocate, from first label space information of each hop that is located in the first network on the first LSP, a label to each hop that is located in the first network on the first LSP,
   determine incoming and outgoing interface information of each hop that is located in the first network on the first LSP according to topology information of each hop that is located in the first network on the first LSP,
   stitch the first LSP and the third LSP, and
   generate forwarding data of each hop that is located in the first network and each hop that is located in the other network on the first LSP, wherein the third LSP is an LSP that uses the service controller as an ingress, uses the second service controller as an egress, and passes through the other network.

14. The service controller according to claim 13, wherein the processor is configured to allocate an incoming label to the service controller on the third LSP, wherein the incoming label is an outgoing label of a previous hop of the service controller on the first LSP, and allocate an outgoing label to the second service controller on the third LSP, wherein the outgoing label is an incoming label of a next hop of the second service controller on the first LSP, wherein each hop on the third LSP except the service controller and the second service controller constitutes each hop that is located in the other network on the first LSP.

15. The service controller according to claim 13, wherein:
the processor is configured to:
   allocate, from first label space information of each hop on the second LSP, a label to each hop on the second LSP, determine incoming and outgoing interface information of each hop on the second LSP according to topology information of each hop on the second LSP, and generate forwarding data of each hop on the second LSP; and
the sender is configured to:
   send the forwarding data of each hop on the second LSP to each node device corresponding to each hop on the second LSP to complete establishment of the second LSP.

16. The service controller according to claim 13, further comprising:
a receiver, configured to receive registration information sent by each forwarding device in a network to which the service controller belongs, wherein the registration information comprises topology information of each forwarding device and first label space information of each forwarding device.

17. The service controller according to claim 13, wherein:
the sender is configured to send identifier information of each hop on the first LSP to the second service controller for backup.

18. A service controller, comprising:
a receiver, configured to receive identifier information, which is sent by a first service controller, of each hop on a second label switching path (LSP), wherein the second LSP is an LSP, which is determined by the first service controller, from a preset ingress to a preset egress;
a processor, configured to allocate, from second label space information of each hop on the second LSP, a label to each hop on the second LSP, determine incoming and outgoing interface information of each hop on the second LSP according to topology information of each hop on the second LSP, and generate forwarding data of each hop on the second LSP;
a sender, configured to send the forwarding data of each hop on the second LSP to each node device corresponding to each hop on the second LSP to complete establishment of the second LSP;
the first service controller and the service controller are connected through another network except a first network to which the first service controller and the service controller belong; and
the receiver is configured to receive, from the first service controller, a stitching and binding relationship between the second LSP and a fourth LSP, identifier information of each hop that is located in the first network on the second LSP, and identifier information of an ingress of the fourth LSP, wherein the fourth LSP is an LSP that is established upon triggering by the first service controller, uses the first service controller as the ingress, uses the service controller as an egress, and passes through the other network.

19. The service controller according to claim 18, wherein the processor is configured to:

allocate, from second label space information of each hop that is located in the first network on the second LSP, a label to each hop that is located in the first network on the second LSP;

determine incoming and outgoing interface information of each hop that is located in the first network on the second LSP according to topology information of each hop that is located in the first network on the second LSP; and stitch the second LSP and the fourth LSP, and generate forwarding data of each hop that is located in the first network and each hop that is located in the other network on the second LSP.

20. The service controller according to claim 19, wherein the processor is configured to:

allocate an incoming label to the first service controller on the fourth LSP, wherein the incoming label is an outgoing label of a previous hop of the first service controller on the second LSP; and allocate an outgoing label to the service controller on the fourth LSP, wherein the outgoing label is an incoming label of a next hop of the service controller on the second LSP, wherein each hop on the fourth LSP except the first service controller and the service controller constitutes each hop that is located in the other network on the second LSP.

21. The service controller according to claim 18, wherein the receiver is configured to receive registration information sent by each forwarding device in a network to which the service controller belongs, wherein the registration information comprises topology information of each forwarding device and second label space information of each forwarding device.

22. The service controller according to claim 18, wherein the receiver is configured to receive identifier information, which is sent by the first service controller, of each hop on a first LSP, wherein the first LSP is another LSP, which is determined by the first service controller, from the preset ingress to the preset egress, and the first LSP and the second LSP have a primary/standby protection relationship.

* * * * *